United States Patent
King et al.

(10) Patent No.: US 9,961,992 B2
(45) Date of Patent: May 8, 2018

(54) HEIGHT ADJUSTABLE MONITOR AND KEYBOARD SUPPORT

(71) Applicant: Humanscale Corporation, New York, NY (US)

(72) Inventors: Robert King, New York, NY (US); Vladimir Stanislavovich Chumakov, Vaughan (CA)

(73) Assignee: Humanscale Corporation, New York, NY (US)

( * ) Notice: Subject to any disclaimer, the term of this patent is extended or adjusted under 35 U.S.C. 154(b) by 0 days. days.

(21) Appl. No.: 15/127,638

(22) PCT Filed: Dec. 10, 2015

(86) PCT No.: PCT/US2015/065112
§ 371 (c)(1),
(2) Date: Sep. 20, 2016

(87) PCT Pub. No.: WO2016/094731
PCT Pub. Date: Jun. 16, 2016

(65) Prior Publication Data
US 2017/0196352 A1    Jul. 13, 2017

Related U.S. Application Data

(60) Provisional application No. 62/090,188, filed on Dec. 10, 2014.

(51) Int. Cl.
| | |
|---|---|
| F16M 11/00 | (2006.01) |
| A47B 21/04 | (2006.01) |
| A47B 21/02 | (2006.01) |
| A47B 21/03 | (2006.01) |
| F16M 11/18 | (2006.01) |
| F16M 11/28 | (2006.01) |

(52) U.S. Cl.
CPC .............. *A47B 21/04* (2013.01); *A47B 21/02* (2013.01); *A47B 21/0314* (2013.01);
(Continued)

(58) Field of Classification Search
CPC ....... A47B 23/046; A47B 21/02; A47B 21/04; A47B 21/0321; A47B 21/0073; F16M 11/18; F16M 11/28
(Continued)

(56) References Cited

U.S. PATENT DOCUMENTS

| | | | |
|---|---|---|---|
| 2,471,998 A | 5/1949 | Berggren | |
| 5,189,849 A | 3/1993 | Collins | |

(Continued)

FOREIGN PATENT DOCUMENTS

| | | |
|---|---|---|
| FR | 2931431 A1 | 11/2009 |
| WO | 2006063280 A2 | 6/2006 |

OTHER PUBLICATIONS

European Patent Office, Application No. 15866930.9, European search report, dated Jan. 23, 2017, 9 pages.
(Continued)

*Primary Examiner* — Gwendolyn W Baxter
(74) *Attorney, Agent, or Firm* — Jones Walker LLP

(57) ABSTRACT

A height adjustable workstation for positioning a monitor and a keyboard relative to a work surface. The height adjustable workstation can include a stationary column positioned below the work surface and a movable column coupled to the stationary column and vertically extendable above the work surface. The movable column can support a keyboard support and/or a monitor mount. A counterbalance assembly, which is positioned below the work surface and operatively coupled to both the stationary column and movable column, functions to offset the load carried by the keyboard support and/or monitor mount to provide effortless height adjustment.

13 Claims, 29 Drawing Sheets

(52) U.S. Cl.
CPC ............ *F16M 11/18* (2013.01); *F16M 11/28* (2013.01); *A47B 2021/0321* (2013.01); *A47B 2021/0364* (2013.01); *F16M 2200/048* (2013.01)

(58) Field of Classification Search
USPC ............ 248/157, 162.1, 422, 624, 918, 919; 108/23, 147
See application file for complete search history.

(56) References Cited

U.S. PATENT DOCUMENTS

| | | | |
|---|---|---|---|
| 5,437,235 A * | 8/1995 | Randolph | A47B 21/00 108/25 |
| D401,440 S * | 11/1998 | Brandenberg | D6/654 |
| 5,845,587 A | 12/1998 | Ditonto | |
| 6,189,849 B1 | 2/2001 | Sweere et al. | |
| 2005/0051406 A1 | 3/2005 | Hopper | |
| 2006/0130713 A1 | 6/2006 | Jones et al. | |
| 2006/0161993 A1 | 7/2006 | Cvek | |
| 2011/0155867 A1* | 6/2011 | Griepentrog | A47B 21/0073 248/125.2 |
| 2013/0126682 A1 | 5/2013 | Tholkes et al. | |
| 2014/0137773 A1 | 5/2014 | Mandel et al. | |

OTHER PUBLICATIONS

PCT/US2015/065112 filed Dec. 10, 2015, Search Report and Written Opinion from the ISA/US dated Feb. 10, 2016, 10 pages.

* cited by examiner

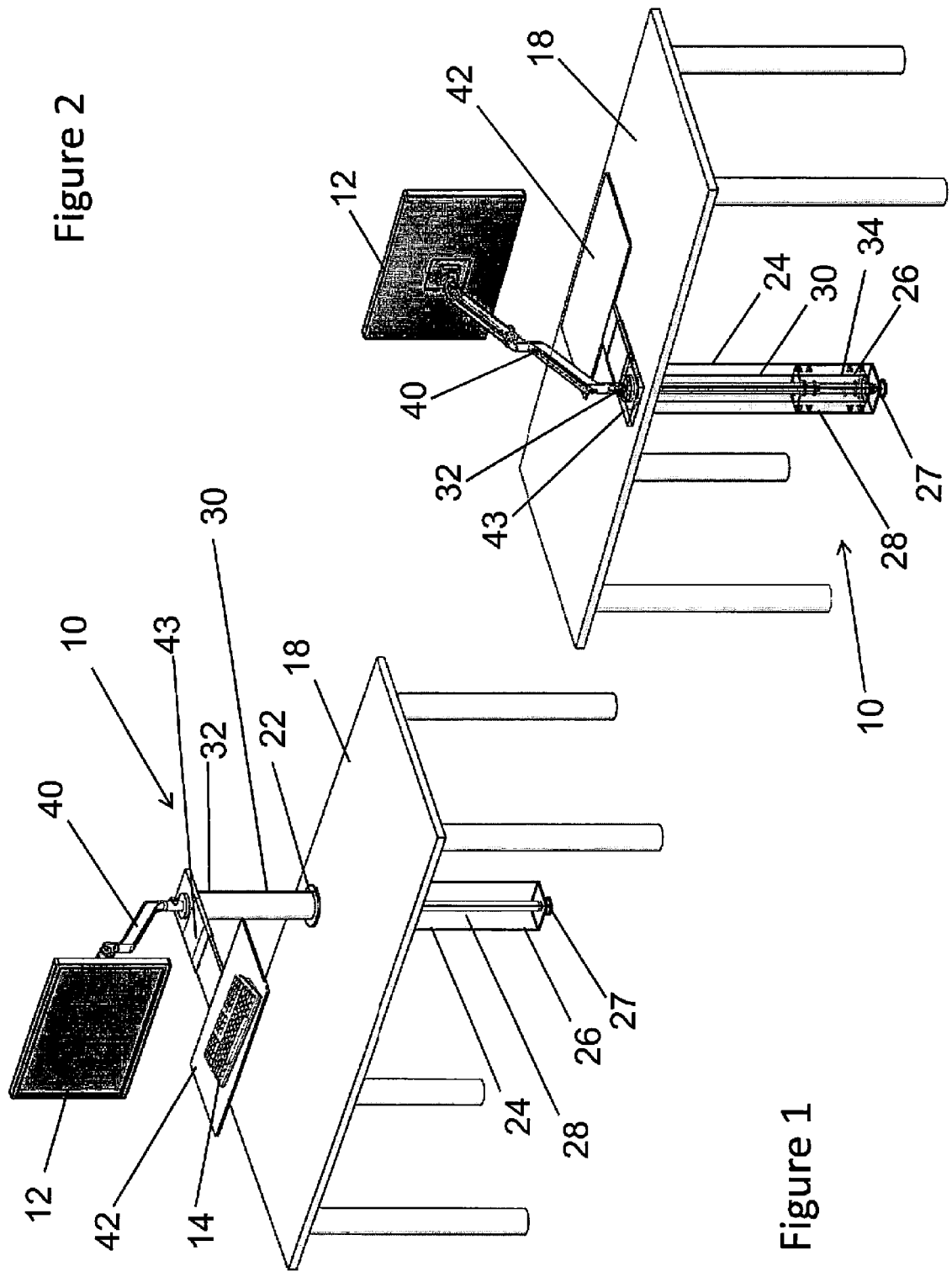

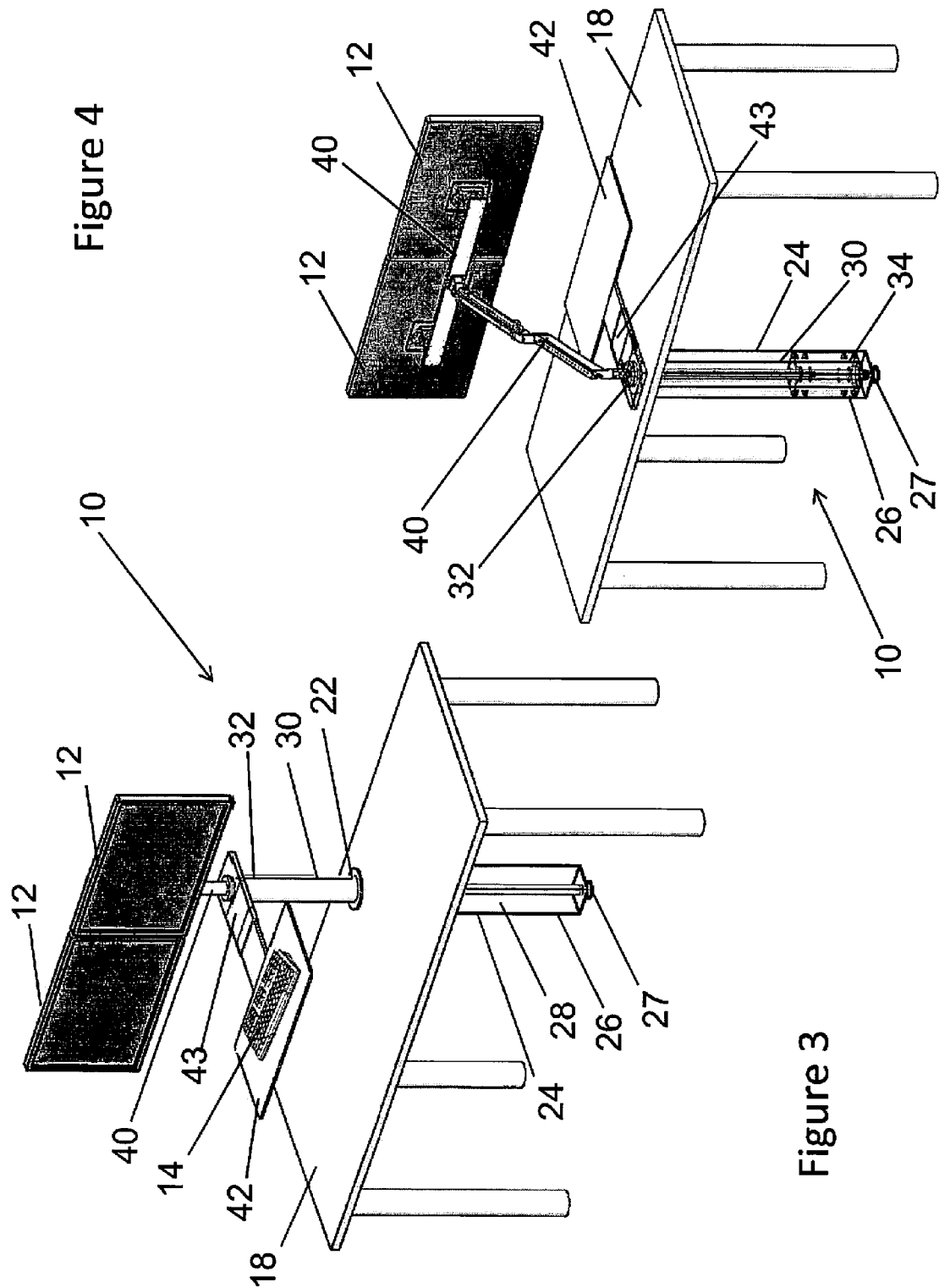

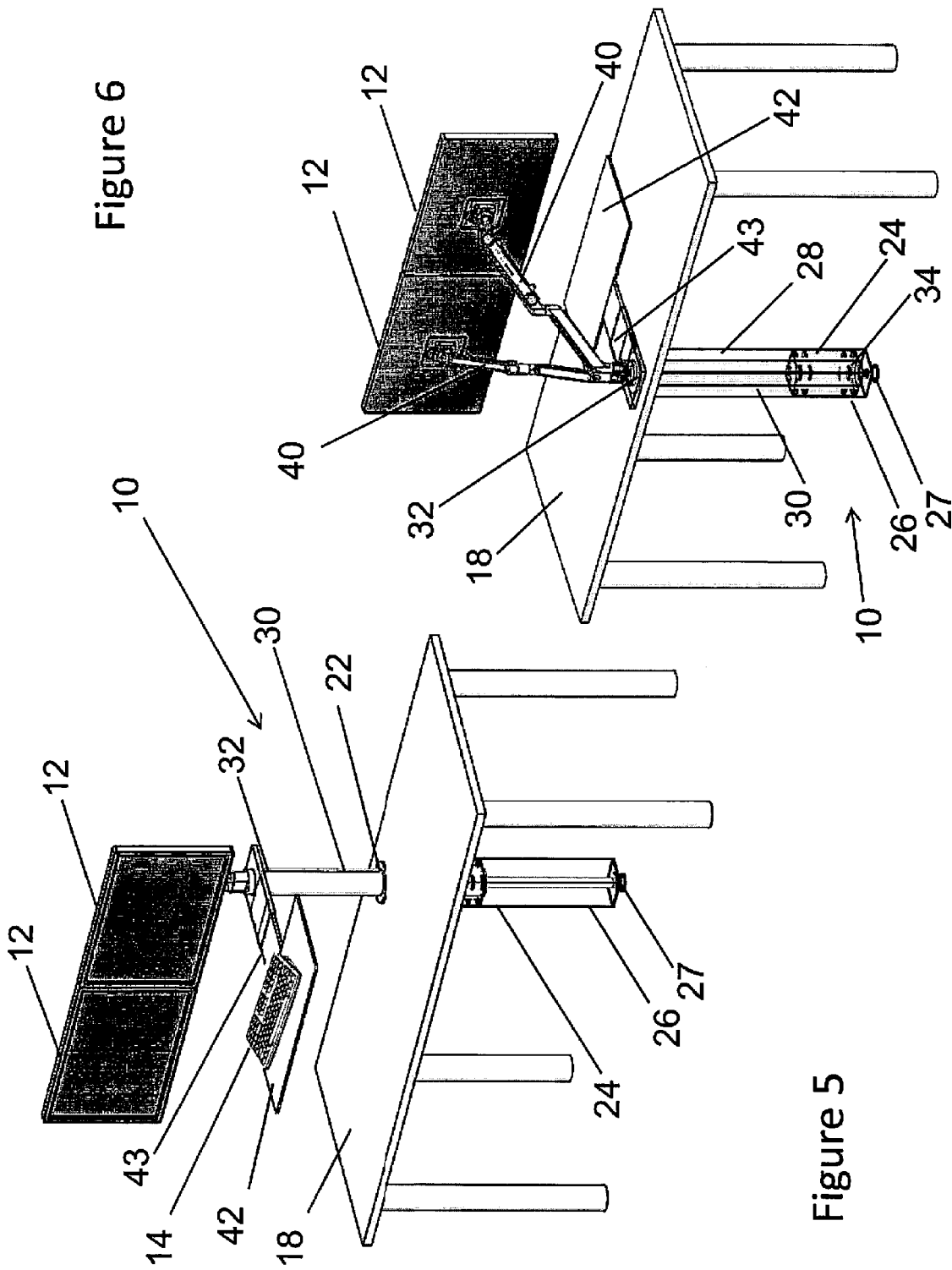

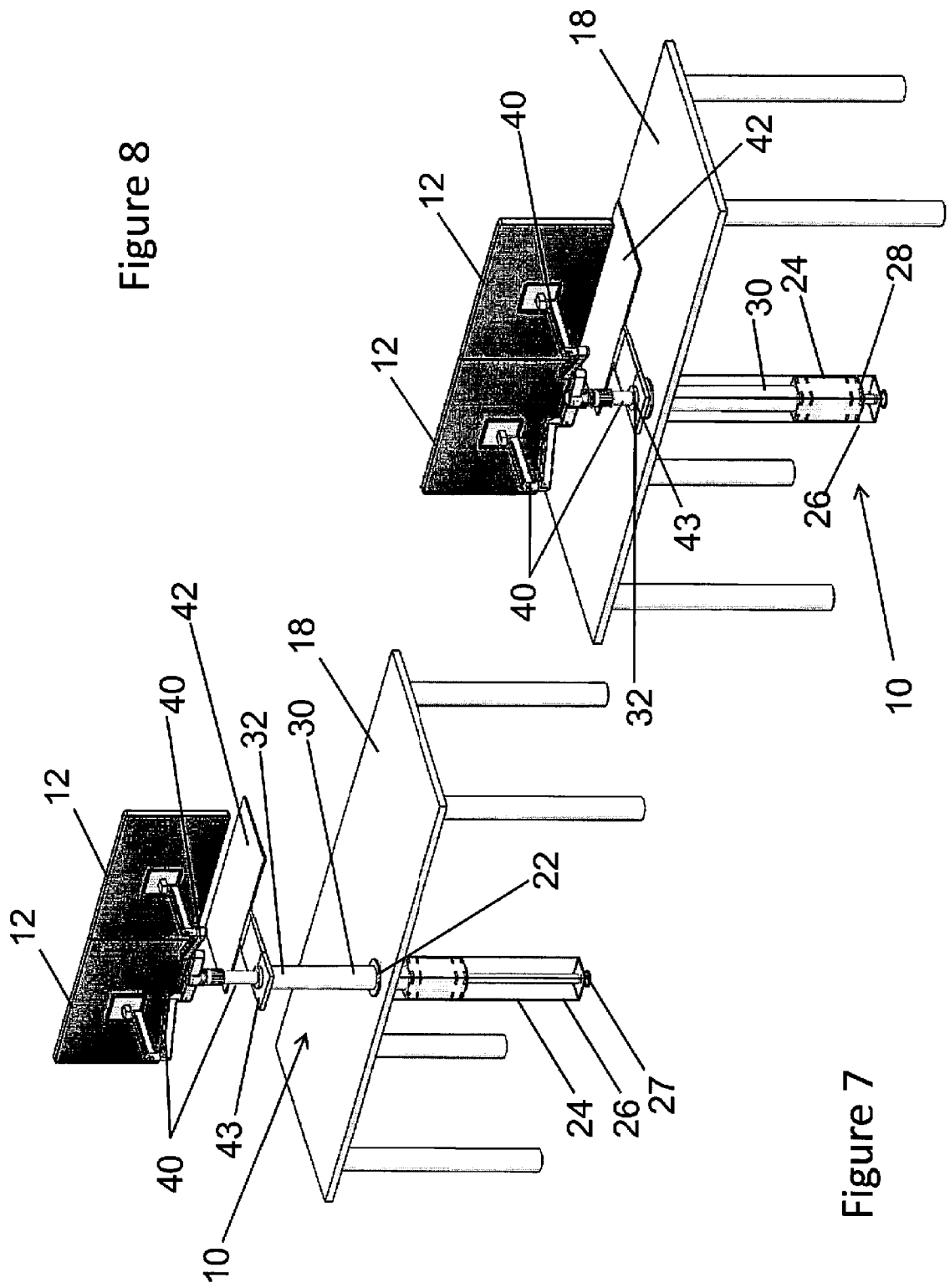

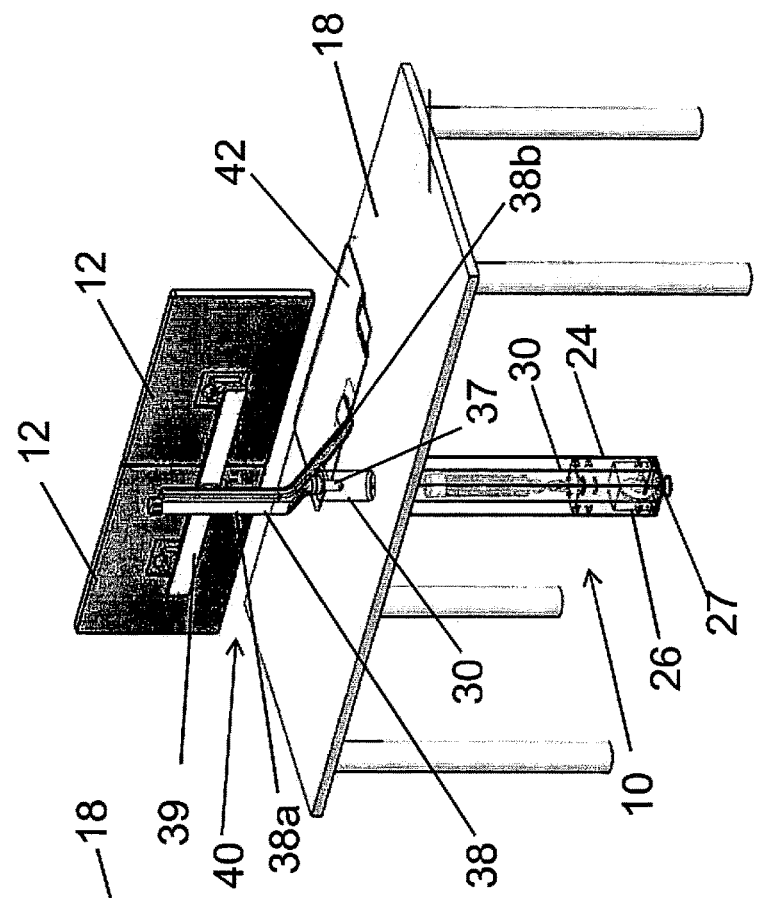
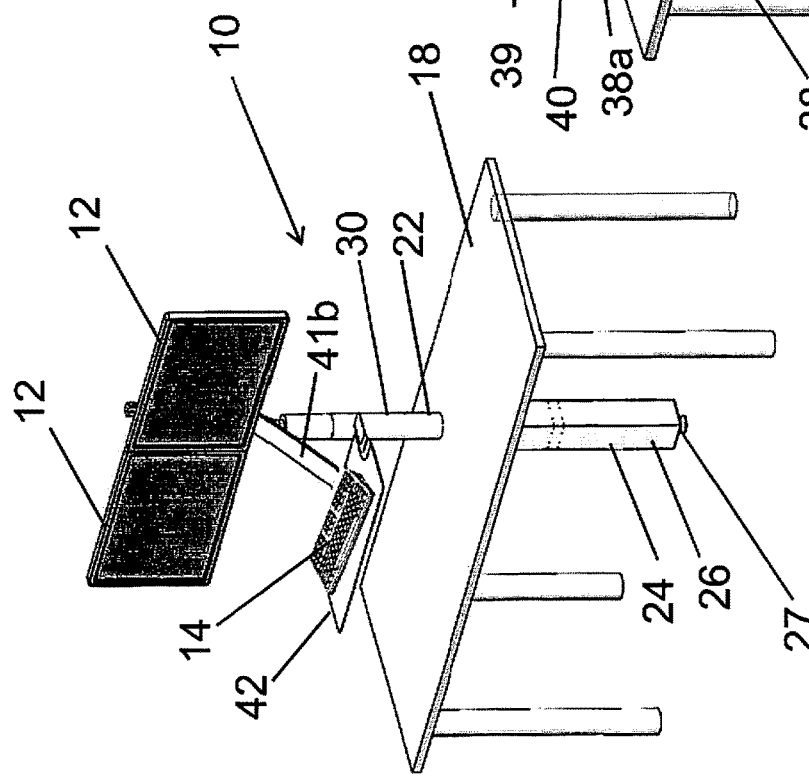

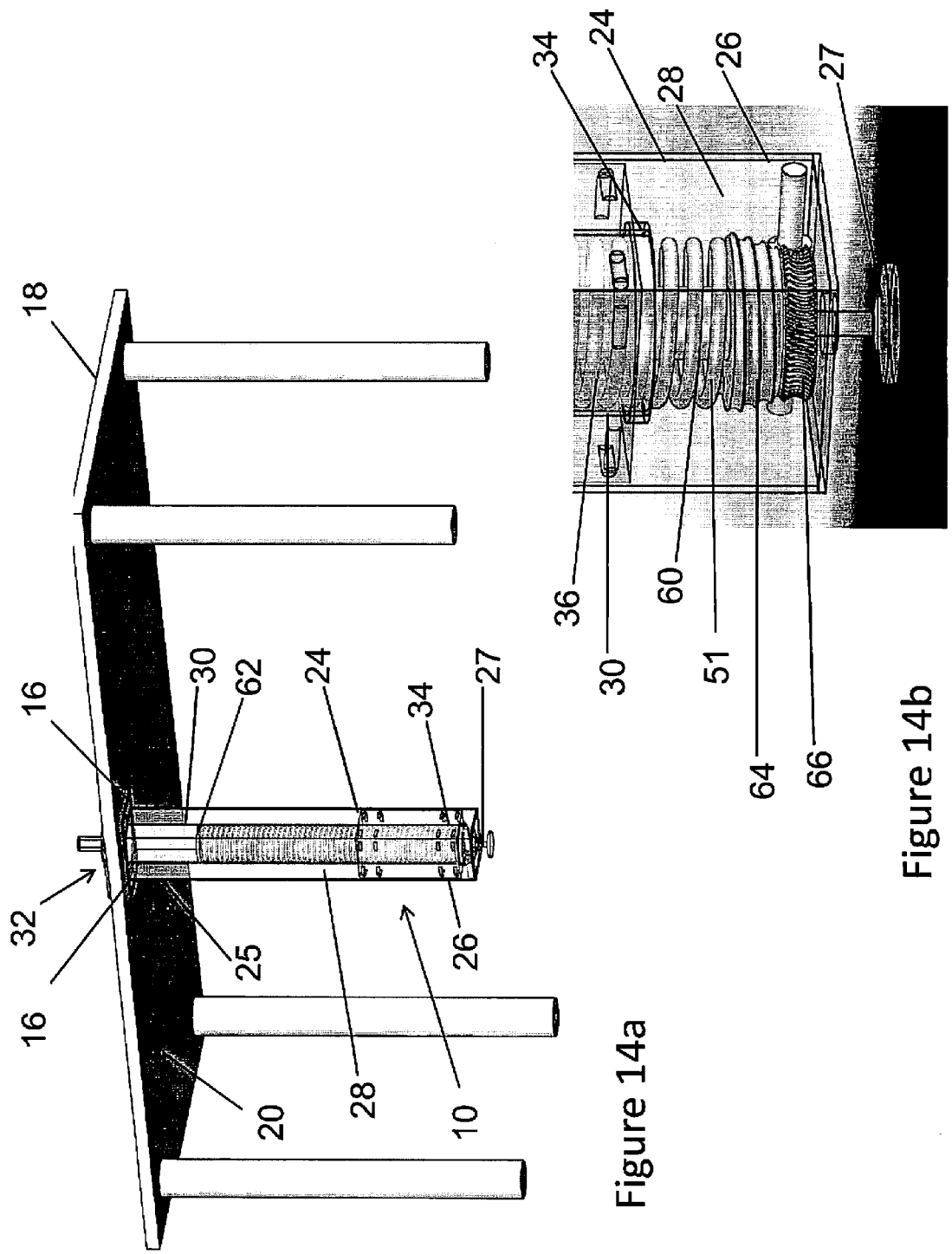

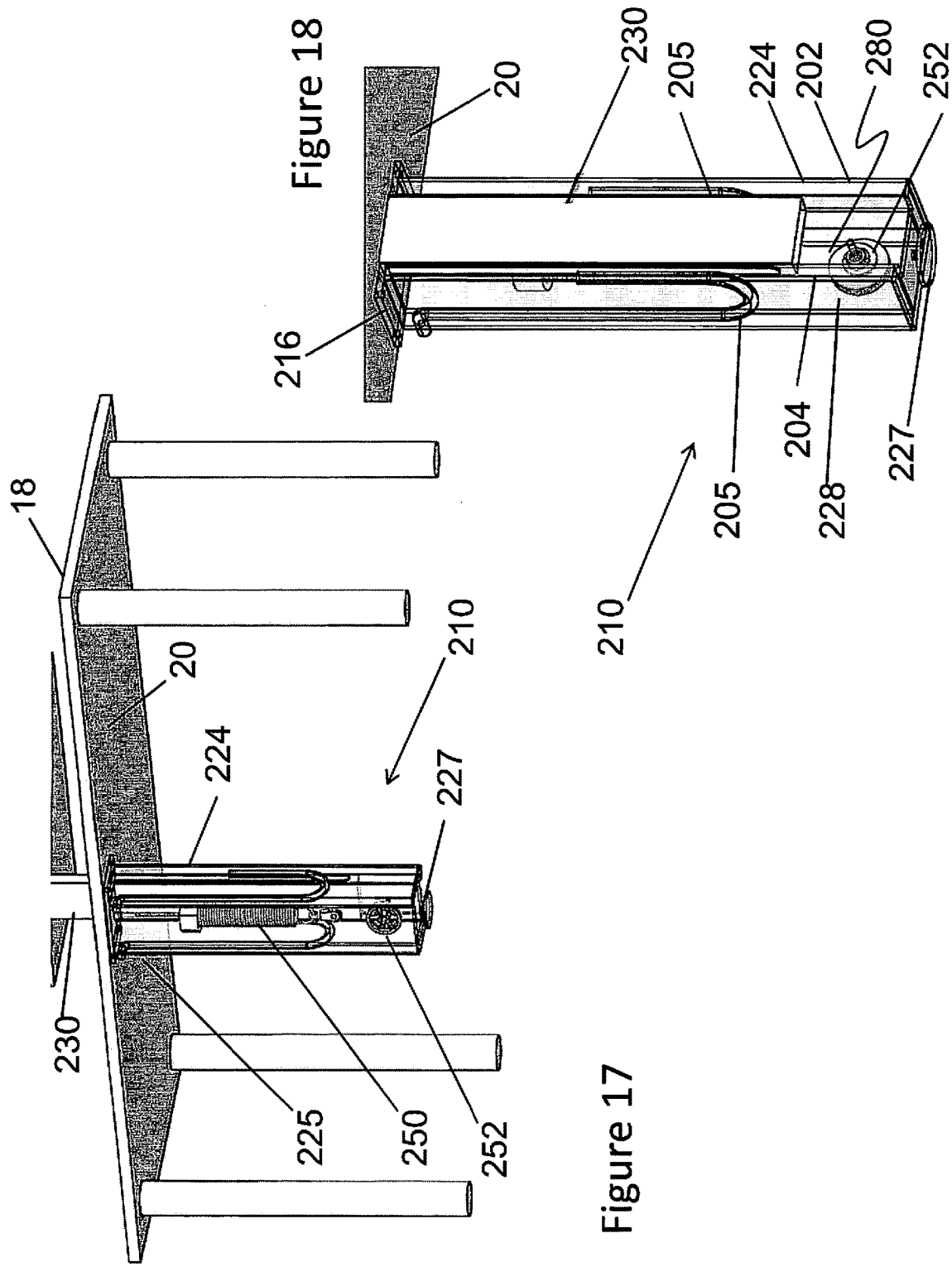

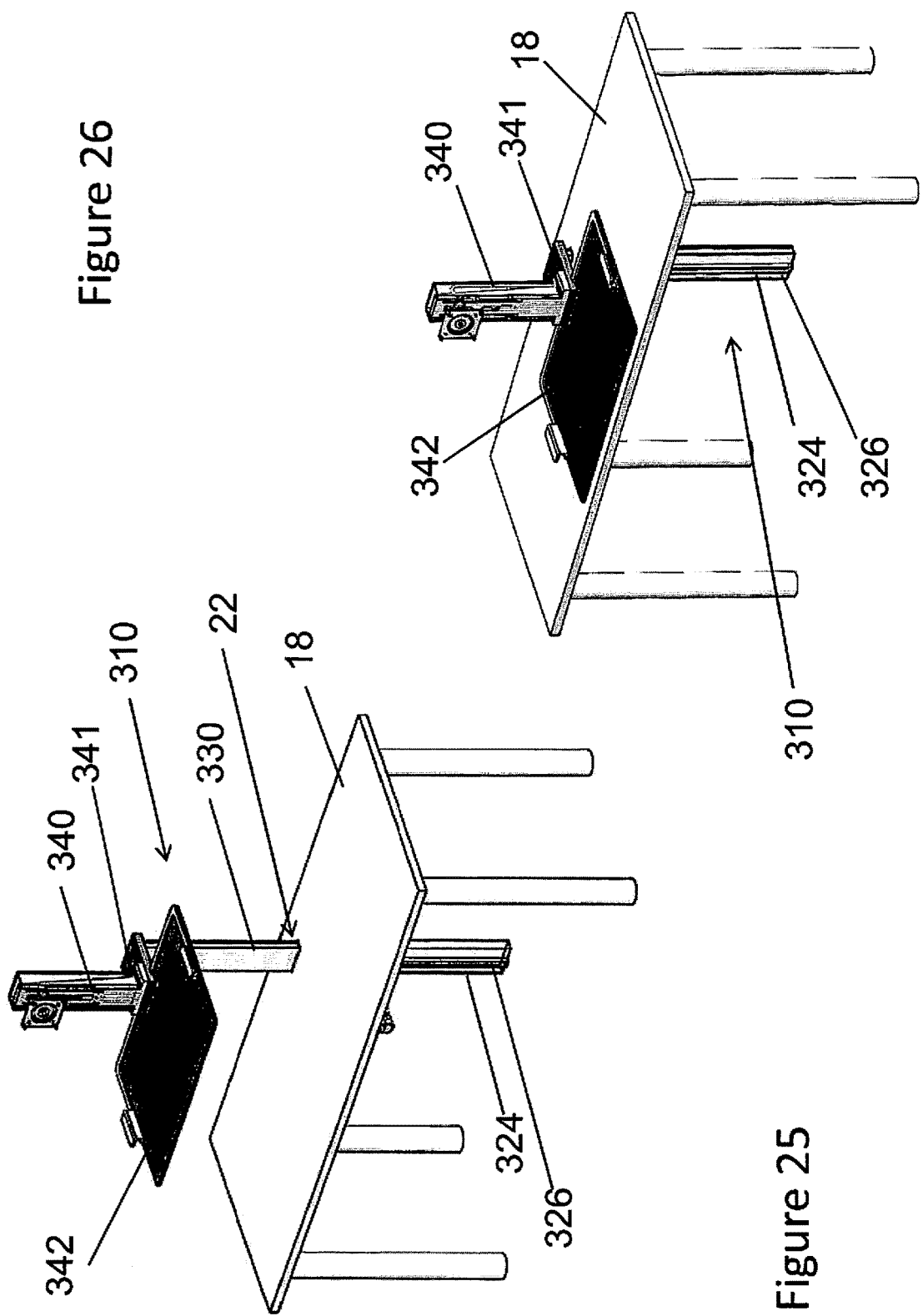

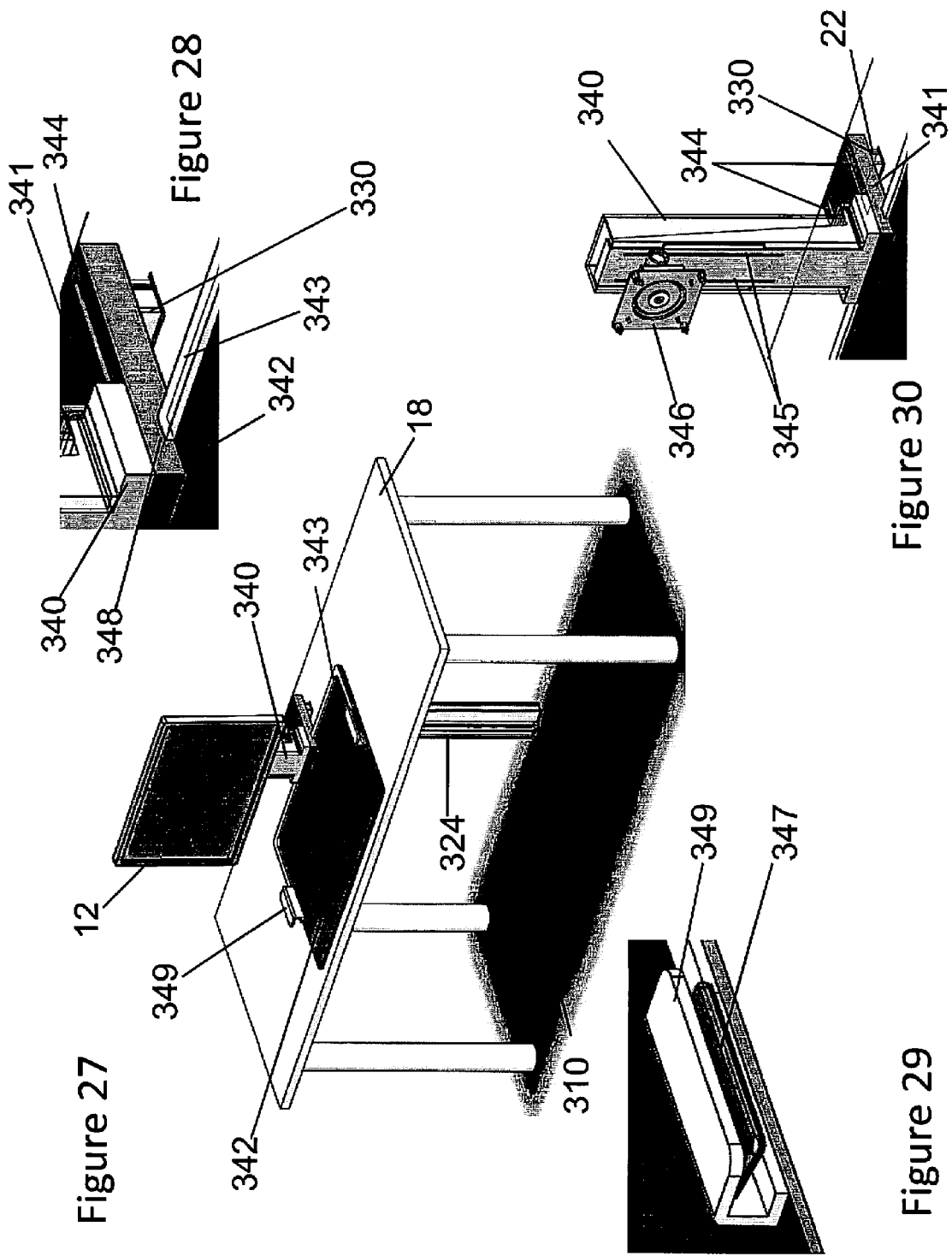

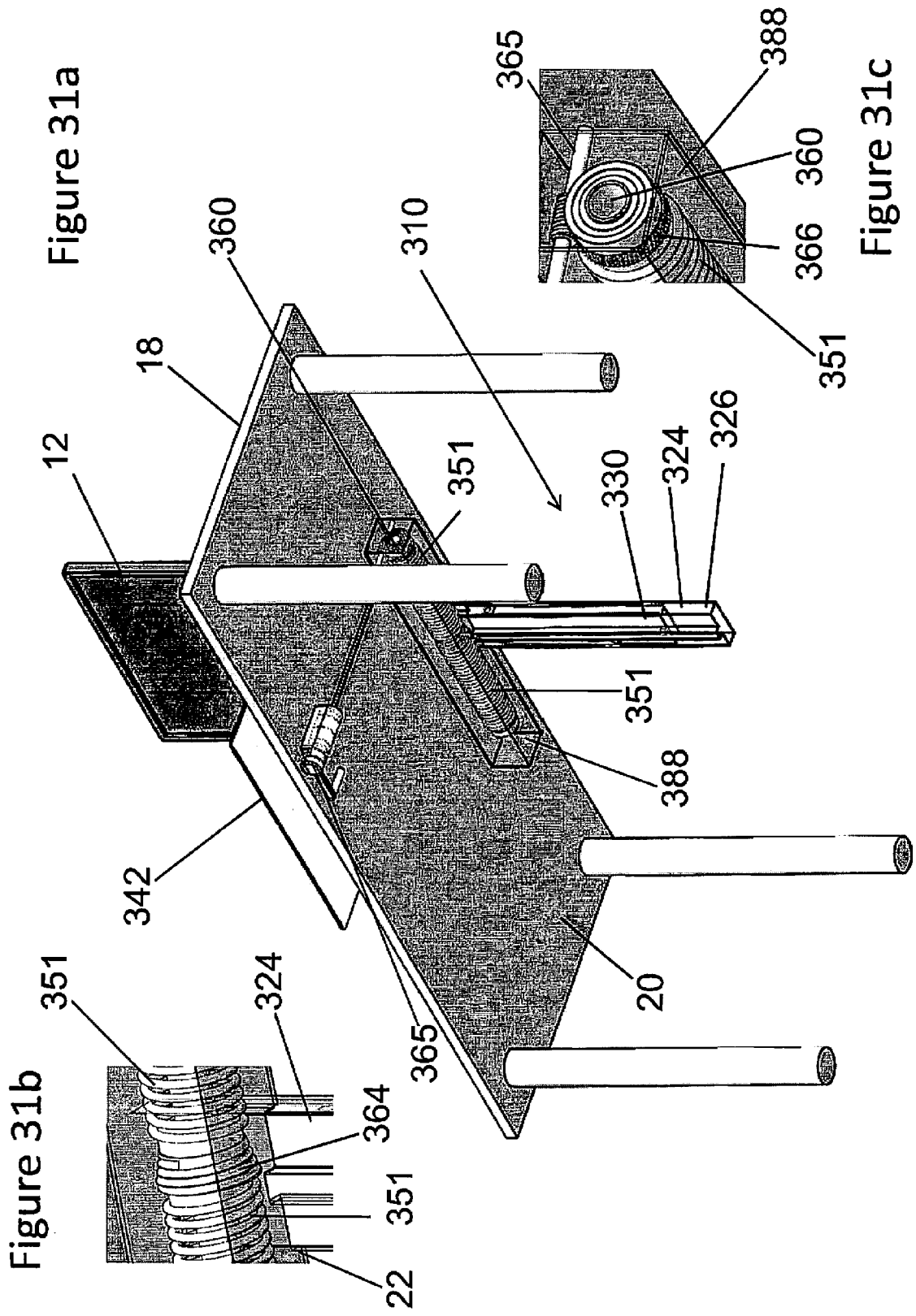

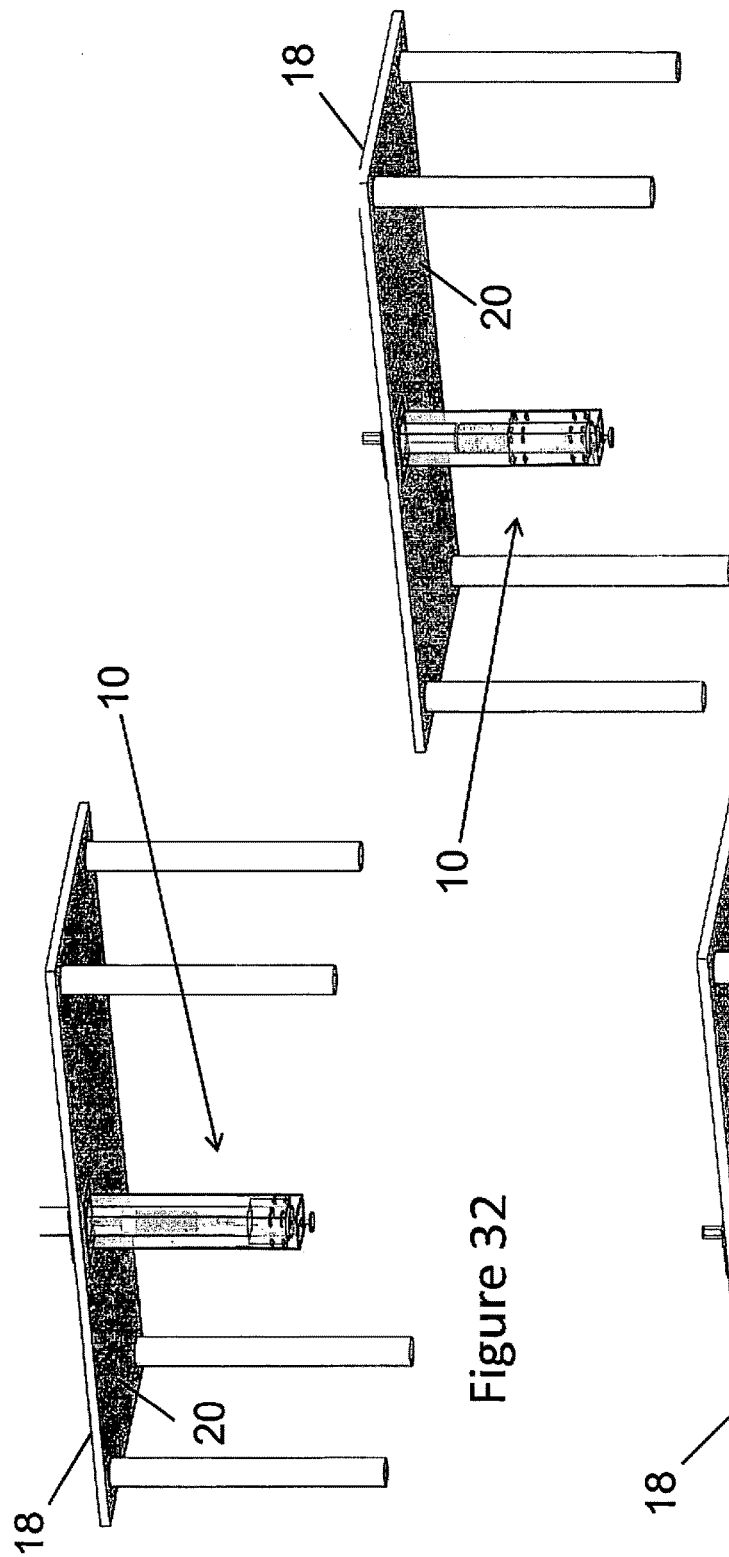
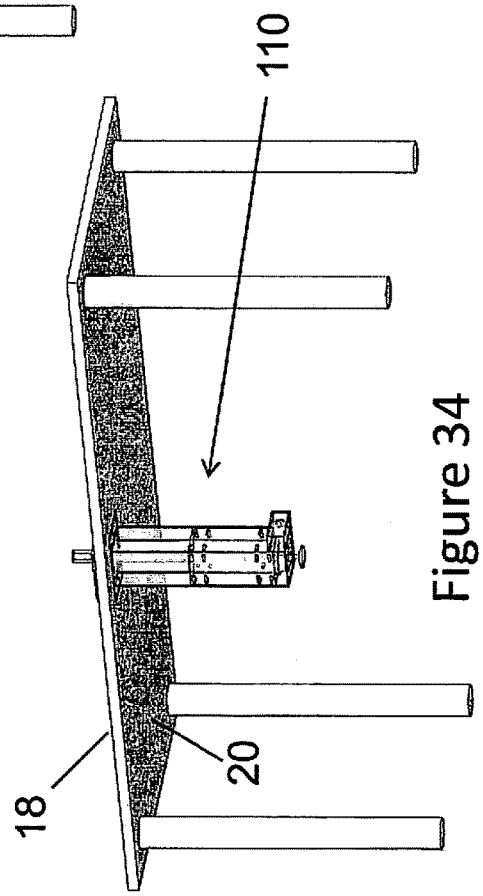
Figure 32
Figure 33
Figure 34

HEIGHT ADJUSTABLE MONITOR AND KEYBOARD SUPPORT

CROSS-REFERENCE TO RELATED APPLICATION

This application is a national stage application under 35 USC § 371 of PCT/US2015/065112, filed on Dec. 10, 2015, which claims the benefit of U.S. Provisional Application No. 62/090,188, filed Dec. 10, 2014, both of which are hereby incorporated by reference.

BACKGROUND

Recent research shows sedentary work increases the risk of cancer and heart disease regardless of other health indicators such as exercise and nutrition. However, standing all day in a static position can also cause health problems, including a significant increase in the risk of carotid atherosclerosis. The healthiest workplace solution allows users to alternate between sitting and standing positions throughout the day.

Height adjustable workstations presently include height adjustable tables with monitor and keyboard supports mounted thereon, the respective heights of which are adjusted as the table is adjusted between sitting and standing positions. A less expensive alternative to height adjustable tables is found in the height adjustable monitor and keyboard supports that typically include a base that is mounted or rests atop a work surface and a support column that extends upwards therefrom to a keyboard platform and a monitor mounting portion. The bases of these mechanisms can take up a lot of space on the work surface and the support columns often extend above the monitor when the user is in a sitting position, which can be obstructive in an open office plan.

SUMMARY

The invention disclosed herein is directed to a height adjustable monitor and keyboard support devised to save space on the work surface while also incorporating a counterbalance mechanism capable of offsetting the load carried by the support to provide effortless height adjustment. In a particular embodiment exemplifying the principles of the invention, a height adjustable monitor and keyboard support or workstation can comprise a stationary column positioned below a work surface and a movable column coupled to the stationary column and vertically extendable above the work surface. The movable column can support a keyboard support and/or a monitor mount. A counterbalance assembly, which is positioned below the work surface and operatively coupled to both the stationary column and movable column, functions to offset the load carried by the keyboard support and/or monitor mount to provide effortless height adjustment.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages in accordance with the present invention. Advantages of embodiments of the present invention will be apparent from the following detailed description of the exemplary embodiments thereof, which should be considered in conjunction with the accompanying drawings in which:

FIG. 1 is a front perspective view of an embodiment of a height adjustable monitor and keyboard support exemplifying the principles of the present invention, wherein the support is in a raised position;

FIG. 2 is a rear perspective view of the embodiment of the height adjustable monitor and keyboard support shown in FIG. 1, wherein the support is in a lowered position;

FIG. 3 is a front perspective view of the embodiment of the height adjustable monitor and keyboard support shown in FIG. 1, shown with an alternative monitor mounting configuration, wherein the support is in a raised position;

FIG. 4 is a rear perspective view of the height adjustable monitor and keyboard support shown in FIG. 3, wherein the support is in a lowered position;

FIG. 5 is a front perspective view of the embodiment of the height adjustable monitor and keyboard support shown in FIG. 1, shown with a further alternative monitor mounting configuration, wherein the support is in a raised position;

FIG. 6 is a rear perspective view of the height adjustable monitor and keyboard support shown in FIG. 5, wherein the support is in a lowered position;

FIG. 7 is a rear perspective view of the embodiment of the height adjustable monitor and keyboard support shown in FIG. 1, shown with yet another alternative monitor mounting configuration, wherein the support is in a raised position;

FIG. 8 is a rear perspective view of the embodiment of the height adjustable monitor and keyboard support of FIG. 7, wherein the support is in a lowered position;

FIG. 11 is a front perspective view of the embodiment of the height adjustable monitor and keyboard support shown in FIG. 1, shown with yet another alternative monitor mounting and keyboard platform configuration, wherein the support is in a raised position;

FIG. 12 is a rear perspective view of the height adjustable monitor and keyboard support of FIG. 11, wherein the support is in a lowered position;

FIG. 13b is an enlarged perspective, transparent view of the bottom end of the lower portion of the height adjustable monitor and keyboard support of FIG. 13a;

FIG. 14a is a rear perspective, transparent view of a lower portion of another embodiment of a height adjustable monitor and keyboard support;

FIG. 14b is an enlarged perspective view of the bottom end of the lower portion of the height adjustable monitor and keyboard support of FIG. 14a;

FIG. 15b is an enlarged perspective, transparent view of the bottom end of the lower portion of the height adjustable monitor and keyboard support of FIG. 15a;

FIG. 15c is an enlarged, partial perspective view of the internal lift mechanism housed within the lower portion of the height adjustable monitor and keyboard support of FIG. 15a;

FIG. 17 is a rear perspective, transparent view of a lower portion of the height adjustable monitor and keyboard support of FIG. 16;

FIG. 18 is a front perspective, partially transparent view of a lower portion of the height adjustable monitor and keyboard support of FIG. 16;

FIG. 25 is a front perspective view of a further embodiment of a height adjustable monitor and keyboard support, wherein the support is in a raised position;

FIG. 26 is a front perspective view of the height adjustable monitor and keyboard support of FIG. 25, wherein the support is in a lowered position;

FIG. 27 is a front perspective view of the height adjustable monitor and keyboard support of FIG. 25, shown with a monitor attached to the monitor mounting portion;

FIG. 28 is an enlarged, partial perspective view of the monitor mounting portion and the keyboard platform of the height adjustable monitor and keyboard support of FIG. 25;

FIG. 29 is an enlarged perspective view of a keyboard platform handle of the height adjustable monitor and keyboard support of FIG. 25;

FIG. 30 is an enlarged perspective view of the monitor mounting portion of the height adjustable monitor and keyboard support of FIG. 25;

FIG. 31a is a bottom perspective, transparent view of the height adjustable monitor and keyboard support of FIG. 25;

FIG. 31b is an enlarged, transparent view of a portion of a counterbalance assembly of the height adjustable monitor and keyboard support of FIG. 31a;

FIG. 31c is an enlarged, transparent view of an end portion of the counterbalance assembly of FIG. 31b;

FIG. 32 is a rear perspective, transparent view of a lower portion of a height adjustable monitor and keyboard support similar to that of FIG. 13a;

FIG. 33 is a rear perspective, transparent view of a lower portion of a height adjustable monitor and keyboard support similar to that of FIG. 14a;

FIG. 34 is a rear perspective, transparent view of a lower portion of a height adjustable monitor and keyboard support similar to that of FIG. 15a;

DETAILED DESCRIPTION

Figure 10:
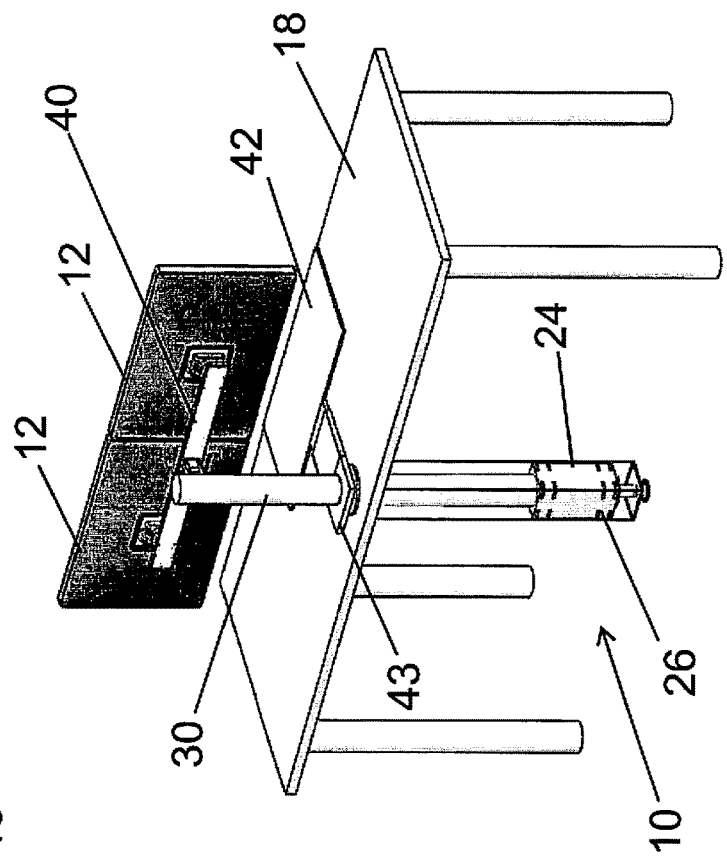
FIG. 10 is a rear perspective view of the embodiment of the height adjustable monitor and keyboard support of FIG. 9, wherein the support is in a lowered position.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. As used herein, the terms "a" or "an" are defined as one or more than one. The term "plurality," as used herein, is defined as two or more than two. The term "another," as used herein, is defined as at least a second or more. The terms "comprises," "comprising," and any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," and "featuring," as used herein, are defined as comprising (i.e., open language). The terms "coupled" and "attached" as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, top and bottom, right and left, and the like may be used solely to distinguish one entity or action from another entity or action without necessarily requiring or implying any actual such relationship or order between such entities or actions.

Herein various embodiments of the present invention are described. To avoid redundancy, repetitive description of similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the drawings, wherein similar reference numerals correspond to similar elements throughout the several views and, more specifically, referring to FIGS. 1 to 12, an exemplary embodiment of a height adjustable support 10 for positioning a monitor 12 and a keyboard 14 relative to a work surface 18 is shown with various monitor mounting configurations. The height adjustable monitor and keyboard support 10 is used with a flat, planar, rigid work surface 18, such as the desktop on a free-standing desk, or a horizontal work surface 18 attached to and supported on a vertical wall or partition, to provide a height adjustable workstation in which a user can alternate between sitting and standing positions. The work surface 18 has a through-hole or opening 22 preferably formed in a rear portion of the work surface 18 and sized to receive a portion of the height adjustable support 10, as discussed in further detail below. The opening 22 can be formed by any suitably cutting or drilling means known in the art.

Figure 13A:
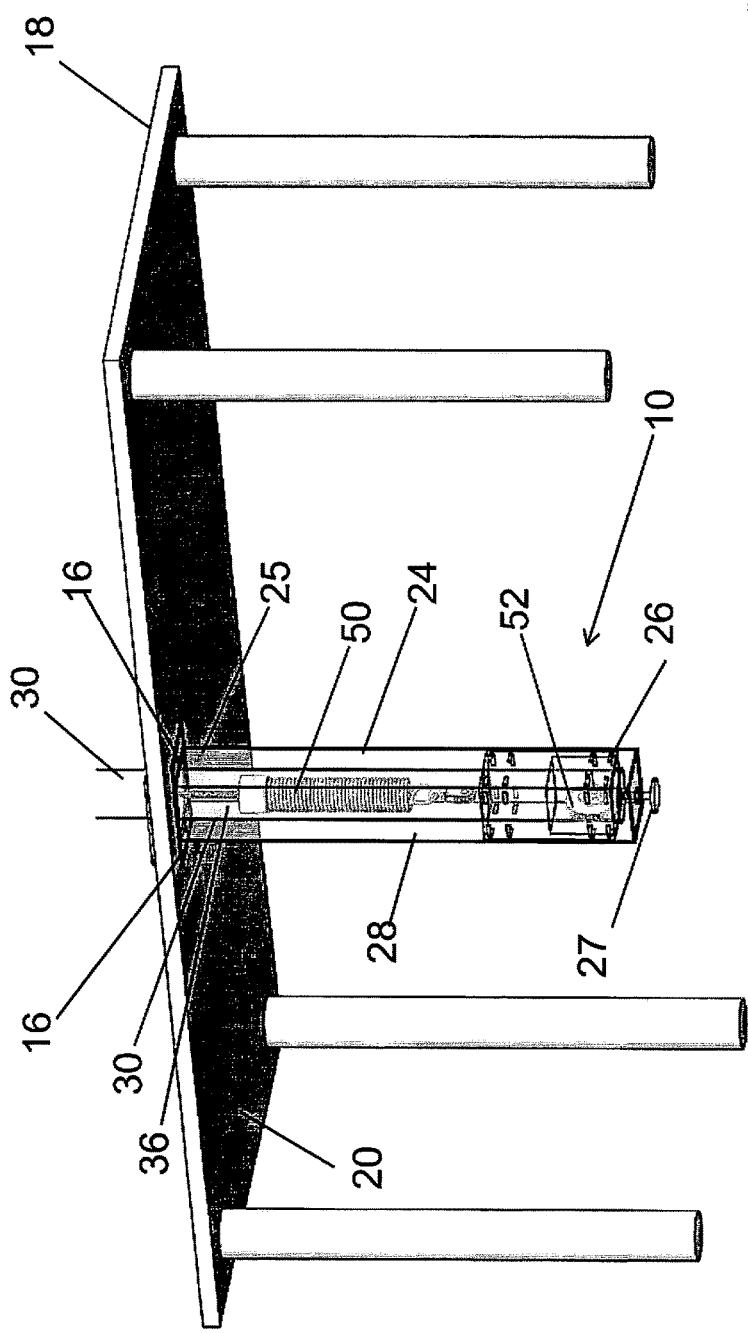
FIG. 13a is a rear perspective, transparent view of a lower portion of the height adjustable monitor and keyboard support of FIGS. 1 to 12.

As shown in FIGS. 1 to 13b, the height adjustable support 10 includes a stationary column 24, a movable column 30, a monitor mounting portion 40, a keyboard platform 42, and a lift mechanism housed within the columns 24, 30. As best illustrated in FIG. 13a, the stationary column 24 is an elongated rigid extension member having a top end 25 and a bottom end 26 and an internal passageway 28 extending therebetween. The top end 25 is an open end fixed to the underside 20 of the work surface 18 via horizontal mounting flanges 16 that extend outwardly from upper ends of the sidewalls of the stationary column 24 by any suitable attachment means known in the art, for example, through bolts or screws. The open top end 25 is positioned about the opening 22 such that a central axis of the opening 22 aligns with a central axis of the stationary column 24. The stationary column 24 extends from the top end 25 fixed to the underside 20 of the work surface 18 in a downward direction away from the work surface 18, towards a ground surface, to the bottom free end 26.

In an exemplary embodiment, since the bottom end 26 is a free end, spaced a distance from a ground surface at varying heights, depending upon the height of the work surface 18, the bottom end 26 can include an extendible support member 27 that extends in a downward direction from the bottom end 26, for example, by turning or unscrewing the support member 27 in a first direction (e.g., a clockwise direction), to engage a ground surface and thereby provide additional tension to serve as additional support for the stationary column 24. If additional space is needed between the bottom end 26 and the ground surface, the support member 27 can be easily retracted back into the internal passageway 28 of the stationary column 24, for example, by turning or screwing the support member 27 in a second direction (e.g., a counter-clockwise direction) opposite the first direction. Additional space may be desired between the ground surface and the bottom end 26 for any number of reasons, including, for example, for storage, electrical wiring, or for cleaning.

The stationary column 24 is sized to receive the movable column 30 within the internal passageway 28, whereby the stationary column 24 and the movable column 30 are in axial alignment. In a lowered position, the bottom end 34 of the movable column 30 is positioned near the bottom end 26 of the stationary column 24 and the top end 32 of the movable column is positioned through the work surface opening 22, either adjacent the work surface 18 (as depicted in FIGS. 2, 4, 6 and 8), slightly above the work surface 18 (as depicted in FIG. 12), or at a height above the work surface 18 in line with the height of the attachment portion at the back of the monitor 12 relative to the work surface 18 when the user is in a seated position (as depicted in FIG. 10). The movable column 30 is movably coupled within the stationary column 24 such that the bottom end 34 of the movable column 30 moves up and down within the internal passageway 28 as the height adjustable monitor and keyboard support 10 is adjusted between a lowered (or sitting) and a raised (or standing) position. The monitor mounting portion 40 and the keyboard platform 42 are attached to the movable column 30. Therefore, as the support 10 is raised from a lowered position, for example, by applying a lifting force to the keyboard platform 42, the movable column 30 moves with the monitor mounting portion 40 and the keyboard platform 42, whereby the bottom end 34 of the movable column 30 moves towards the top end 25 of the stationary column 24. Since the stationary column 24 is attached to the underside 20 of the work surface 18, the stationary column 24 remains stationary as the support 10 is raised and lowered and receives varying lengths of the movable column 30 therein, depending upon the preferred height of the monitors 12 relative to the work surface 18.

The monitor mounting portion 40 can take on any configuration known in the art for supporting at least one monitor 12 above a work surface 18. Although the monitor mounting portion 40 is shown in some embodiments as supporting one or two monitors 12, the invention should not be limited to supporting only one or two monitors 12. It is also within the scope of the invention for the support 10 to include a monitor mounting portion 40 configured to support more than two monitors 12.

Figure 9:
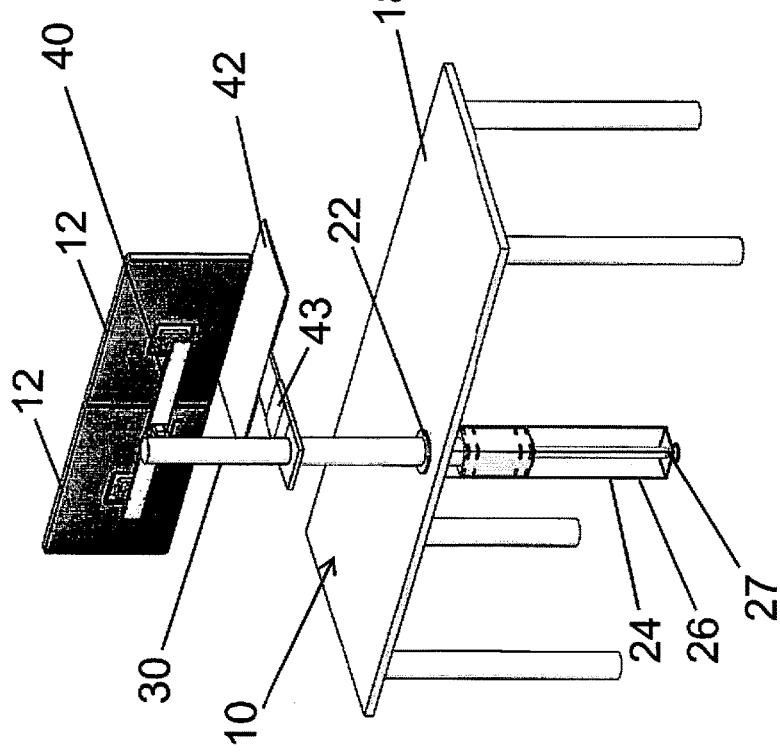
FIG. 9 is a rear perspective view of the embodiment of the height adjustable monitor and keyboard support shown in FIG. 1, shown with an alternative monitor mounting and keyboard platform configuration, wherein the support is in a raised position.

Referring to FIGS. 1 and 2, the monitor mounting portion 40 can be a single monitor arm attached to the movable column 30 such that the monitor mounting portion 40 moves with the movable column 30 in a vertical direction when a user adjusts the support 10 between sitting and standing positions. The horizontal depth of the monitor 12 relative to a user can be adjusted through pivoting the bottom and top portions of the monitor arm relative to one another, as is typically done with numerous monitor arms found in the art. The monitor mounting portion 40 of FIGS. 3 and 4 includes a crossbar attached to the single monitor arm of FIGS. 1 and 2 for mounting two monitors 12. As illustrated in FIGS. 5 and 6, the monitor mounting portion 40 includes two single monitor arms as an alternative means for mounting two monitors 12. As depicted in FIGS. 7 and 8, the monitor mounting portion 40 can alternatively include a post attached to the top of the movable column 30 and at least two monitor arms attached to and extending from the post for supporting at least two monitors 12. The horizontal depth of the monitors 12 relative to a user can be adjusted through pivoting the monitor links or portions of each monitor arm relative to one another. FIGS. 9 and 10 illustrate a further embodiment of a monitor mounting portion 40, which includes a crossbar attached directly to the movable column 30 to support two monitors 12.

In the embodiments shown in FIGS. 1 to 10, the keyboard platform 42 is attached directly to the movable column 30 via a support plate 43. In a preferred embodiment, the keyboard platform 42 is movably attached to the support plate 43 so that the user can adjust the horizontal position of the keyboard platform 42 through a sliding (longitudinal) or pivotal (angular) motion. For example, the support plate 43 may have a longitudinal track along which the keyboard platform 42 is configured to slide to adjust the horizontal depth of the keyboard platform 42 relative to the movable column 30. The support plate 43 may further comprise a swivel bracket, hinge, or similar attachment means known in the art by which the keyboard platform 42 is attached to the support plate 43 to enable the keyboard platform 42 to pivot relative to the support plate 43 and, thus, relative to the movable column 30 for angular adjustment of the keyboard platform 42. The angular adjustment can be about a vertical axis and/or a horizontal axis as is known in the art. The support plate 43 can be attached to the movable column 30 through bolting, screwing, welding, or any other suitable attachment method.

Alternatively, the support plate 43 can be attached to the movable column 30 via friction fit, whereby the support plate 43 includes an opening through which the movable column 30 is received, as in the embodiment illustrated in FIGS. 9 and 10. In this embodiment, the support plate 43 can include a tensioning member to loosen/decrease and tighten/increase the friction between support plate 43 and the movable column 30 such that the height of the keyboard platform 42 can be adjusted independently of the movable column 30 and the monitor 12 by simply raising and lowering the keyboard platform 42, and, thus, the plate 43 along the central axis of the movable column 30 when the tensioning member is loosened and then tightening the tensioning member at the desired height. In a similar manner, the angular position of the keyboard platform 42 can also be adjusted by pivoting the keyboard platform 42 and, thus, the plate 43 about the central axis of the movable column 30 when the tensioning member is loosened. The angular position of the keyboard platform 42 can then be locked in place by tightening the tensioning member.

With respect to the embodiments shown in FIGS. 1 through 8, the monitor mounting portion 40 can be attached to the support plate 43, or to the movable column 30 through an opening in the support plate 43, by any suitable attachment method, such as through bolting, screwing, welding or the like. In the embodiment of FIGS. 9 and 10, the monitor mounting portion 40 is attached directly to the movable column 30 by any suitable attachment method, such as through bolting, screwing, welding or the like.

Referring to FIGS. 11 and 12, an alternative mounting portion 40 can include a horizontal crossbar 39 configured to support at least two monitors 12 and a support arm 38 having a vertical portion 38a connected to the crossbar 39 and an angled portion 38b extending from a lower end of the vertical portion 38a at an obtuse angle, i.e., downward and away from the vertical portion 38a in a direction towards a user. The keyboard platform 42 is attached to the lower end of the angled portion 38b. The support arm 38 may be formed integrally as a continuous single piece having a bend distinguishing the vertical portion 38a from the angled portion 38b. Alternatively, the vertical portion 38a and the angled portion 38b may be separate components pivotally attached to one another through any suitable attachment means known in the art. As illustrated in FIG. 12, the support arm 38 is attached to the movable column 30 through an attachment member 37 adjacent the bend between the vertical portion 38a and the angled portion 38b. The attachment member 37 is received within the top of the movable column 30. The attachment member 37 can be a bolt, a screw, or any other suitable attachment mechanism known or contemplated in the art.

The height adjustable monitor and keyboard support 10 of FIGS. 1 through 12 includes a lift mechanism having a counterbalance assembly housed within the internal passageways 28 and 36 of respective stationary and movable columns 24 and 30 to offset the load on the support 10 for effortless height adjustment. There are many counterbalance assemblies known in the art of height adjustable tables and various counterbalance lift mechanisms. Any suitable counterbalance assembly that could fit within a telescoping column system could be incorporated in an embodiment of the support 10 in accordance with the present invention.

Figure 13B:
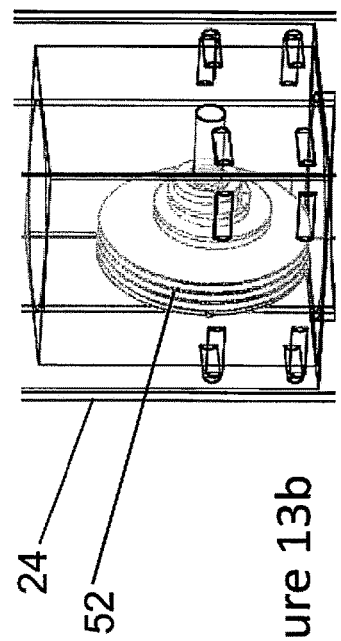

Referring to FIGS. 13a and 13b, an exemplary counterbalance assembly can include an extension spring 50 coupled to a snail cam pulley 52 via a lift cable and pulley system. It is well known that the force exerted, for example, by a typical extension spring (also known as a tension spring) varies linearly with its extension. To offset the linearly increasing force exerted by the extension spring 50, the counterbalance assembly includes a snail cam pulley 52, which operates in conjunction with the extension spring 50 to provide a relatively constant counter-weighting force. A preload mechanism, such as a hex key, can be used to adjust the tension on the spring 50 depending on the amount of weight the height adjustable monitor and keyboard support 10 is intended to support.

Turning to FIGS. 14a and 14b, another exemplary counterbalance assembly can include a longitudinal drive shaft 60 coupled to a torsion spring 51 similar to those commonly used, for example, in garage door openers. The shaft 60 extends coaxially through the internal passageways 28 and 36 of respective stationary and movable columns 24 and 30. The torsion spring 51 is disposed about the shaft 60 and includes a stationary cone 62 at a top end and a winding cone 64 at the bottom end. The winding cone 64 is coupled to a worm gear 66 that charges the torsion spring 51 by winding the drive shaft 60. The worm gear 66 can be driven by an electric motor or through any mechanical crank means known in the art.

Figure 15A:
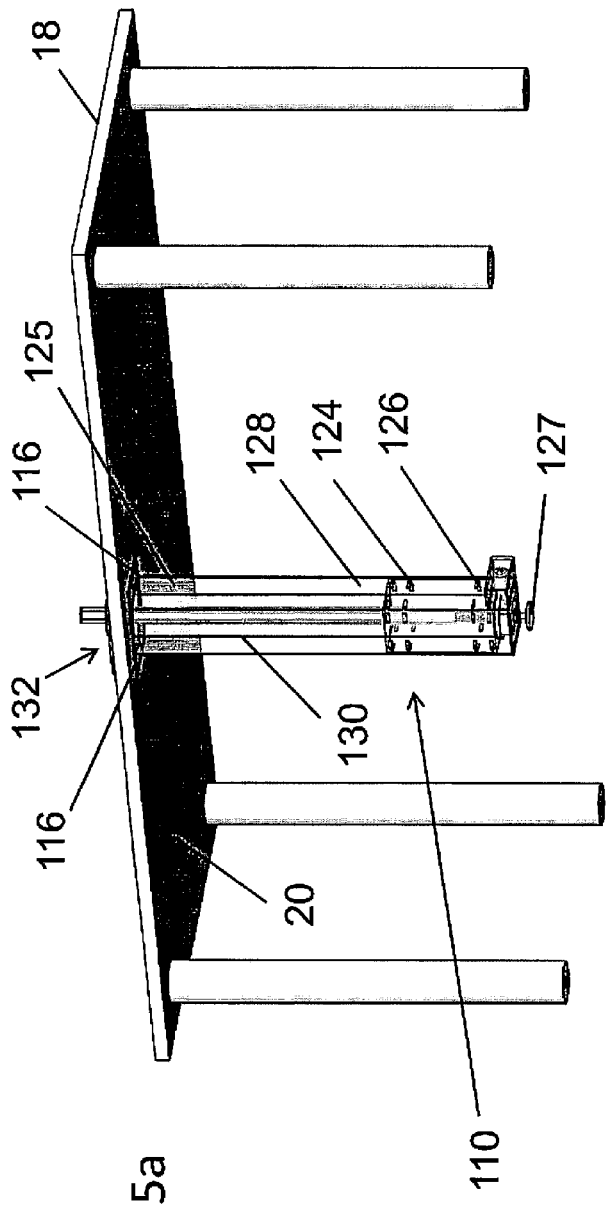
FIG. 15a is a rear perspective, transparent view of a lower portion of a further embodiment of a height adjustable monitor and keyboard support.
Figure 15C:
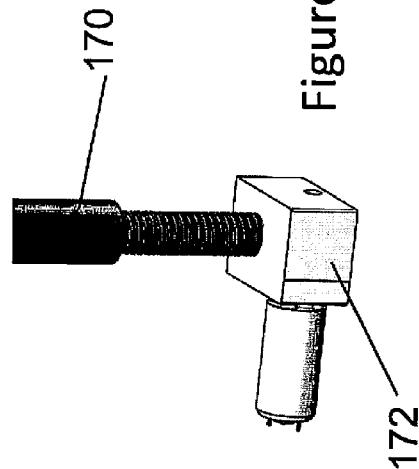
Figure 15B:
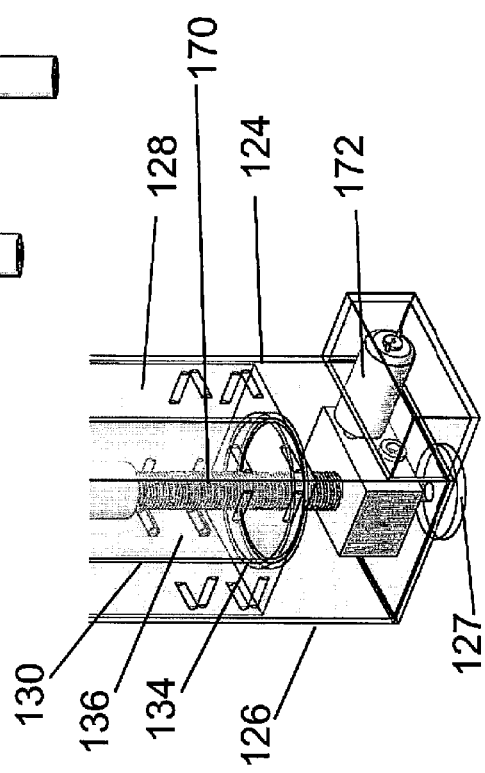

FIGS. 15a through 15c illustrate another embodiment of a height adjustable monitor and keyboard support 110 in accordance with the teachings of the present invention, in which similar components to those in the height adjustable monitor and keyboard support 10 are denoted by similar reference numerals increased by 100. The lift mechanism of the support 110 includes a linear actuator comprised of a spindle 170 coupled to a geared motor 172 that is electrically powered.

Figure 16:
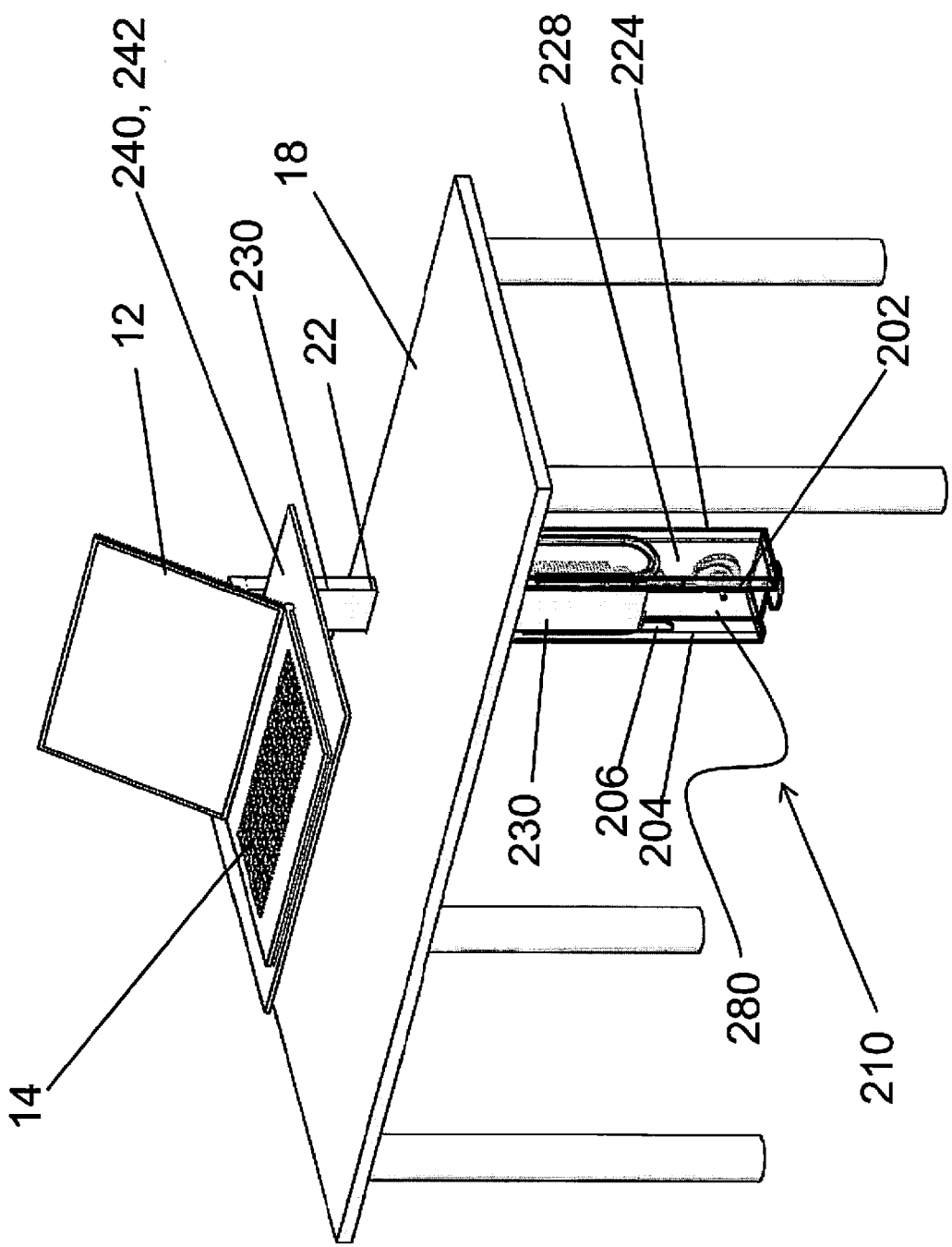
FIG. 16 is a front perspective, partially transparent view of another exemplary height adjustable monitor and keyboard support, wherein the support is in a raised position.
Figure 20:
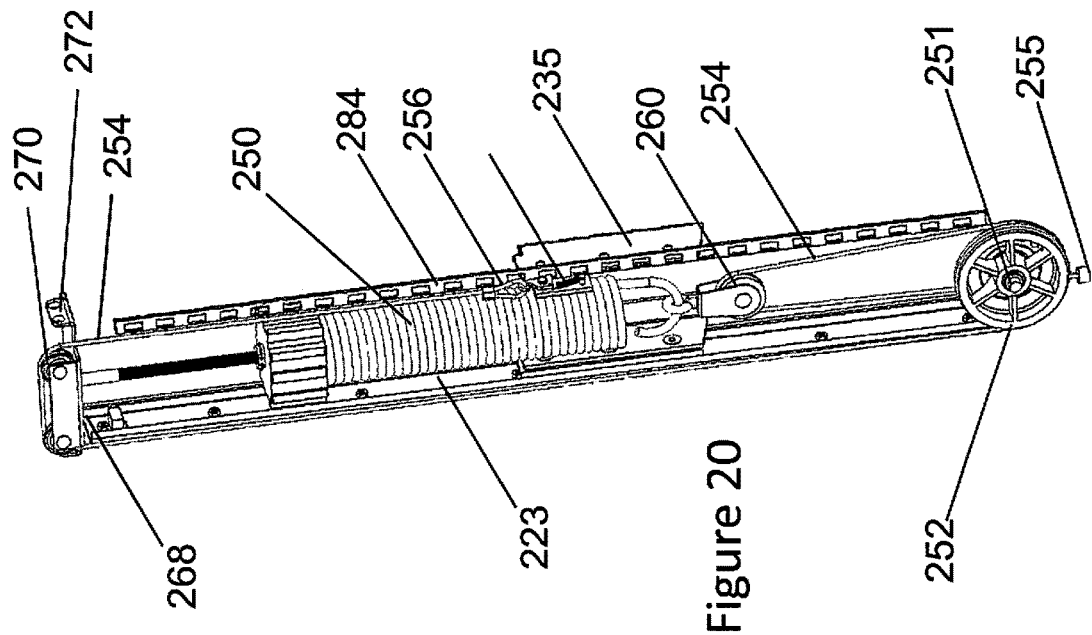
FIG. 20 is a rear perspective view of the counterbalance assembly of FIG. 19.
Figure 19:
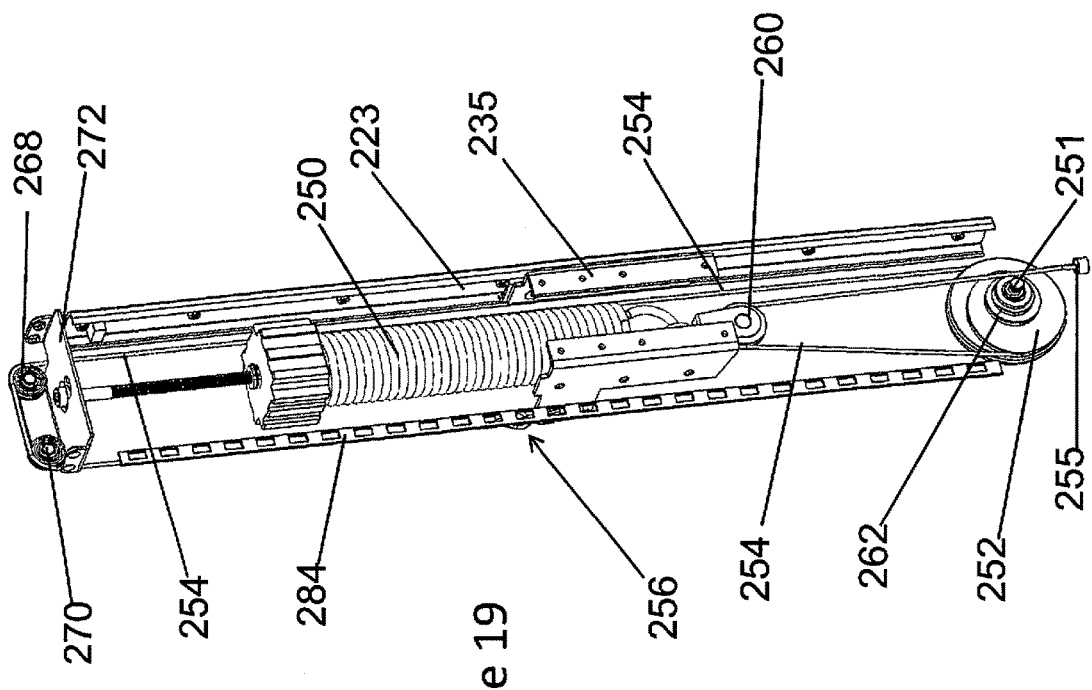
FIG. 19 is a front perspective view of a counterbalance assembly of the height adjustable monitor and keyboard support of FIG. 16.
Figure 21:
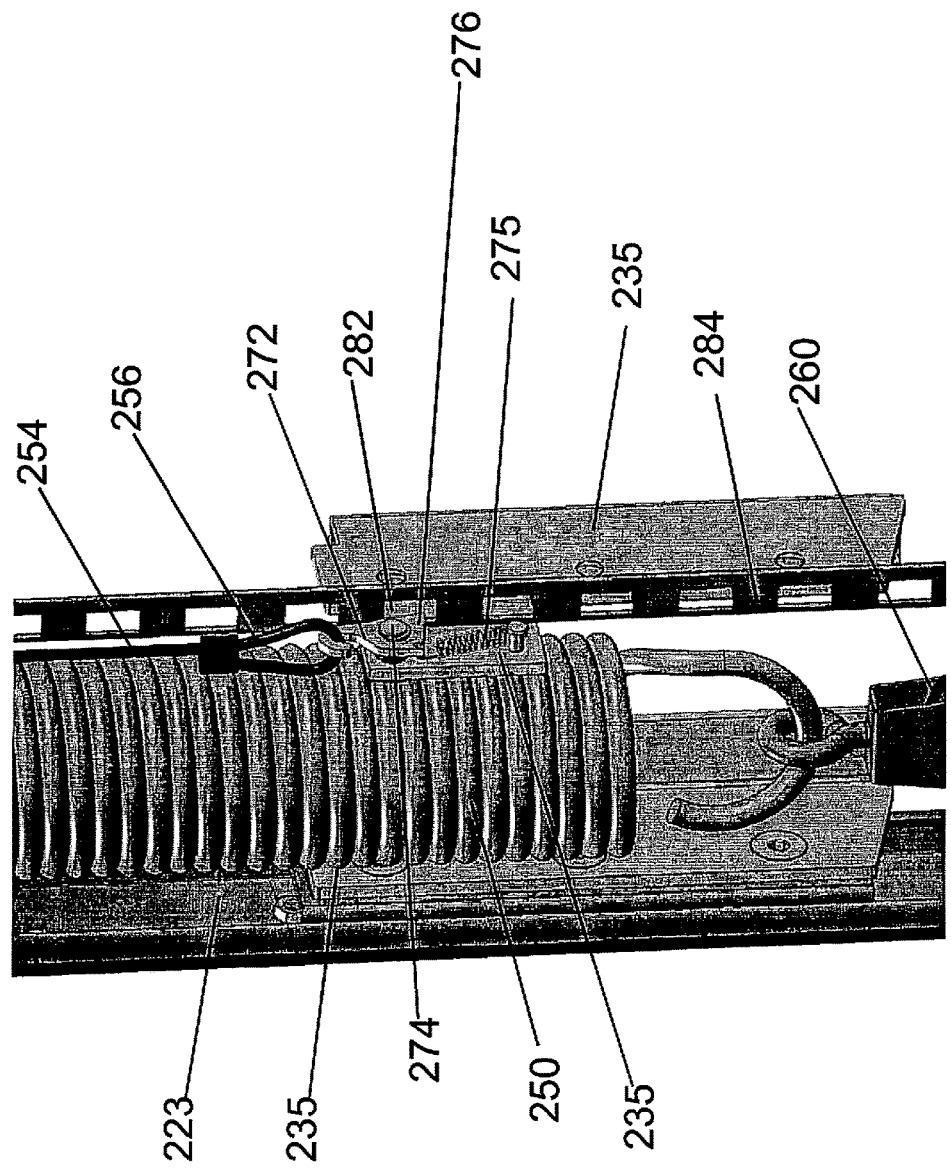
FIG. 21 is an enlarged rear perspective view of the safety assembly of the height adjustable monitor and keyboard support of FIG. 16.

FIGS. 16 through 23 depict yet a further embodiment of a height adjustable monitor and keyboard support 210 in accordance with the teachings of the present invention, in which similar components to those in the height adjustable monitor and keyboard support 10 are denoted by similar reference numerals increased by 200. As shown in FIG. 16, the monitor mounting portion 240 serves as the keyboard platform 242 and vice versa as the support 210 supports a laptop computer rather than a separate monitor and keyboard. In this embodiment, the movable column 230 is not received within an internal passageway of the stationary column 224 in a telescoping relationship as with the previous embodiments. Rather, the stationary column 224 has a recessed portion 280, defined by two side walls 202 and 204, configured to receive the movable column 230 in sliding engagement. The movable column 230 can slide within the recessed portion 280 through any suitable linear slide mechanism known in the art, for example, through a roller assembly, a carriage slide assembly, linear rails or the like. As depicted in FIGS. 19 and 21, a bracket 235, which attaches within the movable column 30 (not shown) is slidingly engaged with a side rail 223 of the stationary column 224.

The lift mechanism of the height adjustable monitor and keyboard support 210 includes a counterbalance assembly housed within the internal passageway 228 of the stationary column 224. As depicted in FIGS. 19 and 20, the exemplary counterbalance assembly includes an extension spring 250 coupled to a snail cam pulley 252, which operates in conjunction with the extension spring 250 to provide a relatively constant counter-weighting force. The snail cam pulley 252 is fixed within the bottom end 226 of the stationary column 224 via an axle 251, which is attached to the rear wall of the stationary column 224. The axle 251 defines an axis of rotation about which the snail cam pulley 252 turns. The extension spring 250 is coupled to the snail cam pulley 252 by a cable 254 and a pulley 260.

Figure 22:
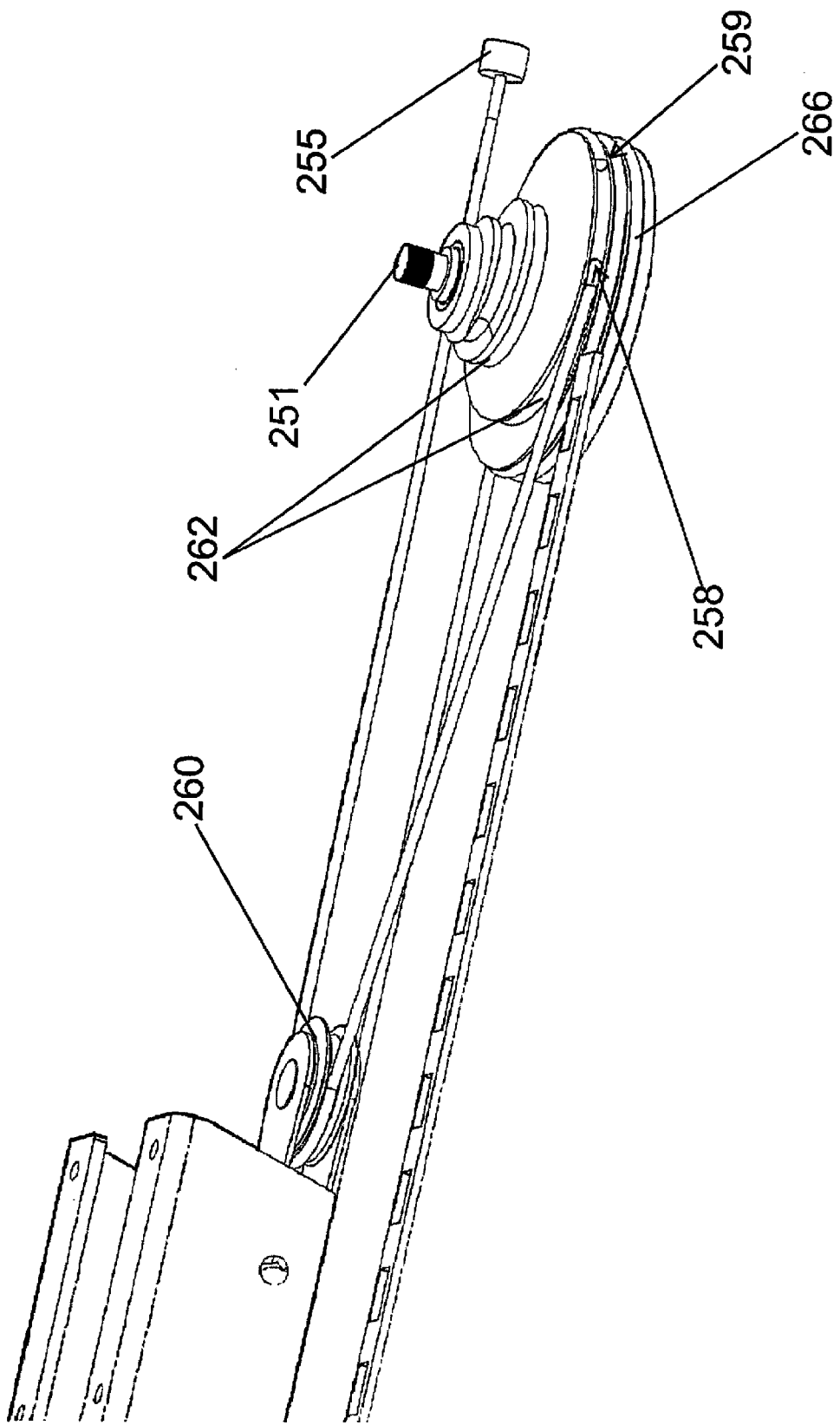
FIG. 22 is a side perspective view of the snail cam pulley and cable of the counterbalance assembly of FIG. 20.

In one embodiment, the cable 254 is a single cable having a first end 255 attached to a fixed attachment point within the bottom end 226 of the stationary column 224 and a second end 256 that is coupled to the movable column 230. The cable 254 extends upward from the first fixed end 255, travels around a pulley 260 coupled to the extension spring 250, and back downward toward the snail cam pulley 252. The cable 254 engages within a spiral cam track 262 of the snail cam pulley 252 and passes through a first hole 258 and a second hole 259 to engage with a circumferential lift track 266 of the snail cam pulley 252, as best illustrated in FIG. 22. From the lift track 266, the cable 254 extends upward in a direction substantially parallel to the central axis of the spring 250 and travels around a pair of pulleys 268 and 270, each of which is coupled to a bracket 272 fixed to the inside of at least one wall of the stationary column 224. From the pulley 270, the cable 254 travels in a downward direction substantially parallel to the central axis of the spring 250 to the second end 256 which is indirectly attached to the movable column 230, as described in further detail below.

Figure 23:
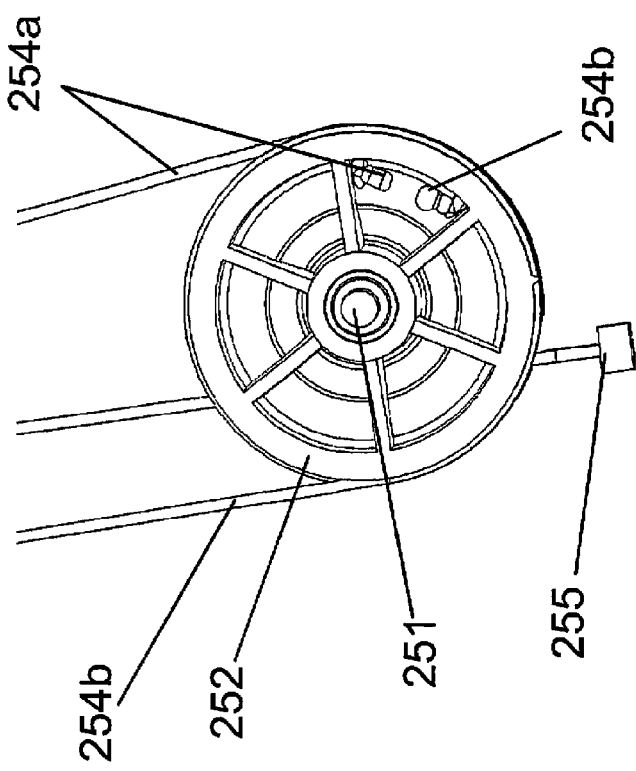
FIG. 23 is a rear view of the snail cam pulley and cable of the counterbalance assembly of FIG. 19.
Figure 24:
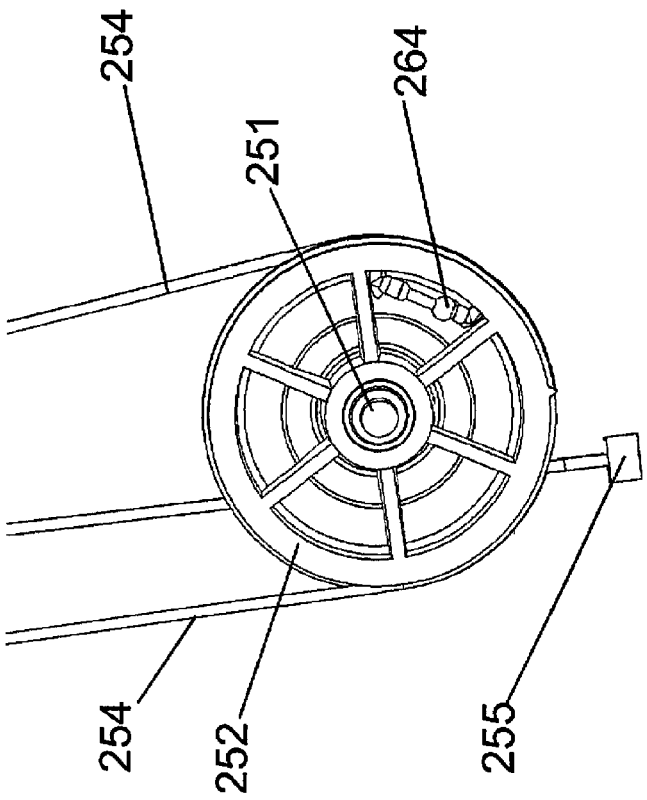
FIG. 24 is a rear view of a snail cam pulley and cable of another exemplary counterbalance assembly for a height adjustable monitor and keyboard support.

As illustrated in FIG. 23, at least one knot 264 is formed in the cable 254 in the portion positioned between the holes 258 and 259. The knot 264 functions as a stop such that the portion of the cable 254 between the first end 255 and the knot 264 remains a fixed length (a portion of which engages and travels along the cam track 262 of the snail cam pulley 252); and the portion between the knot 264 and the second end 256 remains a fixed length (a portion of which engages and travels along the lift track 266 of the snail cam pulley 252). Alternatively, as depicted in FIG. 24, two separate cables 254a and 254b could be used instead of a single cable with a knot formed therein. The cable 254 or cables 254a and 254b are preferably constructed out of nylon or another synthetic polymer, such as Dyneema® Ultra-High Molecular Weight Polyethylene fiber.

The spiral cam track 262 has a variable radius relative to the axis of rotation of the snail cam pulley 252 and functions as a variable lever arm by which the spring force is applied to the snail cam pulley 252. As the snail cam pulley 252 rotates, the length of the cable 254 engaging the cam track 262 varies. Thus, the snail cam pulley 252 and the cable 254 function as an equalizer assembly configured to convert the linear force exerted by the extension spring 250 to a relatively constant force.

As the support 210 is raised or lowered, for example, through applying a respective lifting or depressing force to the keyboard platform 242, the movable column 230 to which the keyboard platform 242 is attached slides within the recessed portion 280 of the stationary column 224 (via the movable column bracket 235 sliding along a pair of stationary column side rails 223). Depending on whether the movable column 230 is being lifted or lowered, the tension on the cable 254 (the second end 256 of which is attached to the movable column bracket 235) varies. The linear force exerted by the extension spring 250 in conjunction with snail cam pulley 252 (and the varying lengths of the cable 254 engaged in the cam track 262 versus the lift track 266) together function to counterbalance the variable tension on the cable 254 to provide effortless height adjustment.

In an exemplary embodiment, the height adjustable monitor and keyboard support 210 can include a safety assembly that would prevent the movable column 230 from crashing down on a user or the work surface 18 should the cable 254 break. Referring to FIG. 21, a safety rail 284 having a plurality of apertures or openings 282 formed therethrough is longitudinally disposed with the stationary column 224 (not shown) by any suitable means. For example, the safety rail 284 may be attached to the side rail opposing the side rail 223 shown in FIGS. 19 and 20. The second end 256 of the cable 254 is formed in a loop that is received by a toggle 272 in the form of a hook pivotally mounted to the bracket 235 of the movable column 230 by a bolt 274. The bolt 274 defines an axis of rotation for the toggle 272. A spring 275 is attached to the bracket 235 at a bottom end and to the rear bottom corner of the toggle 272 at a top end. Should the cable 254 break, the tension on the second end 256 of the cable 254 would release and a biasing force applied by the spring 275 would cause the toggle 272 to pivot in a rearward direction (away from the movable column bracket 235). The toggle 272 is shaped such that, as the toggle 272 pivots in a rearward direction, the bottom corner 276 opposing the corner to which the spring 275 is attached engages within one of the openings 282 along the safety rail 284. Engagement of the toggle 272 within an opening 282 would lock the movable column 230 (via bracket 235) to the stationary column 224 (via safety rail 284).

As illustrated in FIG. 18, for cable management capabilities, the side walls 202 and 204 of the stationary column 224 can be configured to house electronic wiring 205 for the monitors 12, the keyboard 14, and/or other electronic computer accessories.

A preload mechanism, such as a hex key, can be used to adjust the tension on the spring 250 depending on the amount of weight the height adjustable monitor and keyboard support 210 is intended to support.

Turning to FIGS. 25 through 31c, yet another embodiment of a height adjustable monitor and keyboard support 310 in accordance with the teachings of the present invention is illustrated, in which similar components to those in the height adjustable monitor and keyboard support 10 are denoted by similar reference numerals increased by 300. The support 310 includes a plate 341 attached to the top end of the movable column 330 to which both the monitor mounting portion 340 and the keyboard platform 342 are attached. As depicted in FIGS. 28 and 30, the plate 341 can have at least one longitudinal slot 344 formed therein to provide horizontal depth adjustment of the monitor 12 attached to the monitor mounting portion 340 relative to a user. The depth of the monitor 12 can be easily adjusted by sliding the monitor mounting portion 40 horizontally along the slots 344. It should be noted that the monitor mounting portion 340, although shown with only one monitor 12 attached thereto, can be configured to support more than one monitor 12, for example, by the addition of a crossbar.

As illustrated in FIG. 30, the monitor mounting portion 340 can have at least one longitudinal slot 345 formed therein to provide vertical height adjustment of the monitor 12 independent of the movable column 330 and the keyboard platform 342. In this embodiment, the monitor attachment portion 346, which mounts a rear of the monitor 12 to the monitor mounting portion 340, can slide vertically along the slots 345. In alternate embodiments, the monitor attachment portion 346 can mount a crossbar configured to support more than one monitor 12 to the monitor mounting portion 340. As best illustrated in FIG. 28, the keyboard platform 342 is attached to the plate 341 by a rim or lip portion 343 that is configured to frictionally engage within a recess 348 formed within the bottom surface of the plate 341.

Referring to FIGS. 31a through 31c, the lift mechanism of the support 310 can include telescoping columns 324 and 330 and a counterbalance assembly that is housed within a housing 388 horizontally disposed underneath the work surface 18 rather than within the telescoping columns 324 and 330. As such, the telescoping columns 324 and 330 can take on a shape that is thinner in at least one direction, for example, in the direction from the rear of the work surface 18 towards the front of the work surface 18. The housing 388 can be mounted directly to the underside 20 of the work surface 18 through any suitable mounting means. The counterbalance assembly can include a longitudinal drive shaft 360 coupled to at least one torsion spring 351 similar to those commonly used, for example, in garage door openers. In the exemplary embodiment depicted in FIGS. 31a and 31b, the counterbalance assembly of the support 310 includes two torsion springs 351 separated by a winding cone 364 and a worm gear 366 that charges the torsion springs 351 by winding the drive shaft 360. The worm gear 366 can be driven by an electric motor or through any mechanical actuation means known in the art, for example, through the hand crank 365 shown in FIG. 31a.

The support 310 can further include a lock mechanism that locks the movable column 330 relative to the stationary column 324, which can comprise any suitable locking mechanism known in the art of telescoping columns. In such embodiment, the lock can be biased to a locked position such that the movable column 330 can only be moved relative to the stationary column 324 through actuation of the lock to an unlocked position, in which the height of the movable column 330 can be adjusted relative to the stationary column 324 and the work surface 18. As illustrated in FIG. 29, a handle 349 can include a lever 347, which when engaged or squeezed against the upper portion of the handle 349 releases the lock to allow for height adjustment of the support 310; and which when disengaged the lock returns to its biased locked position to prevent vertical movement of the support 310.

FIGS. 32 through 34 show the lower portion of various embodiments of a height adjustable monitor and keyboard support with a stationary column 10, 110 of various lengths. Since the stationary columns 24, 124, 224, 324 of the present invention are attached to the underside 20 of the work surface 18, the distance between the bottom ends 26, 126, 226, 326 of the stationary columns 24, 124, 224, 324 and a ground surface can vary, depending on the height of the work surface 18 relative to the ground surface and depending on the length of the stationary column 24, 124, 224, 324. By mounting the lift mechanism below the work surface 18, free space is made available on the work surface 18 and the user is not distracted by an obstructive bulky desktop mechanism.

The telescoping columns described herein can be rectangular, tubular, can include a combination of rectangular and tubular columns (as shown in FIGS. 1 through 12), or can take on any other suitable shape without departing from the scope of the present invention. Any of the telescoping column arrangements disclosed herein can optionally include a roller cage containing a plurality of rollers between the stationary column and the movable column for facilitating frictionless sliding of the movable column relative to the stationary column as the support is raised and lowered.

The opening 22 in the work surface 18 is preferably sized and shaped to receive the movable column 30, 130, 230, 330 with minimal spacing between the work surface 18 and the movable column 30, 130, 230, 330. In the event the opening is sized larger than desired, a grommet cover can be used to fill the open space between the movable column 30, 130, 230, 330 and the work surface 18.

Figure 35:
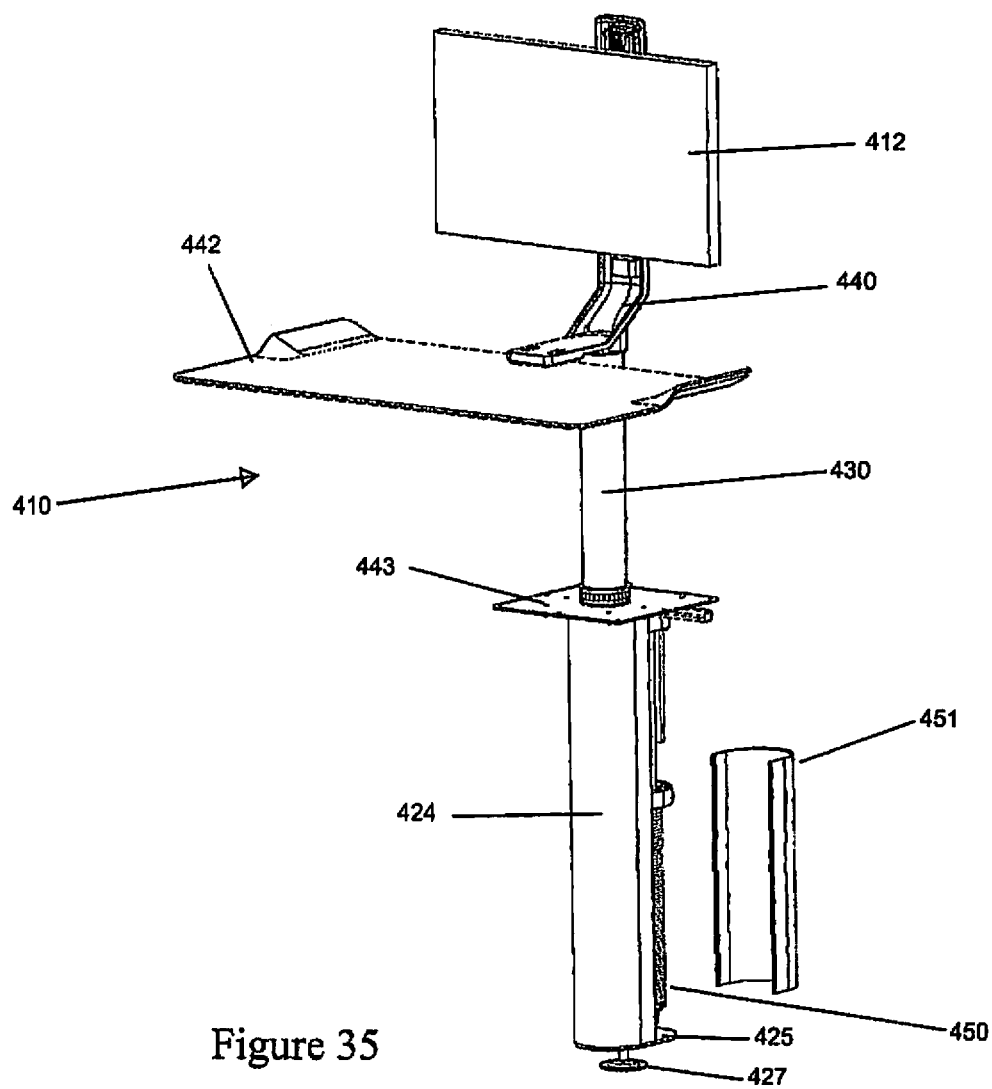
FIG. 35 is a front perspective view of another exemplary height adjustable monitor and keyboard support, wherein the support is in a raised position.
Figure 36:
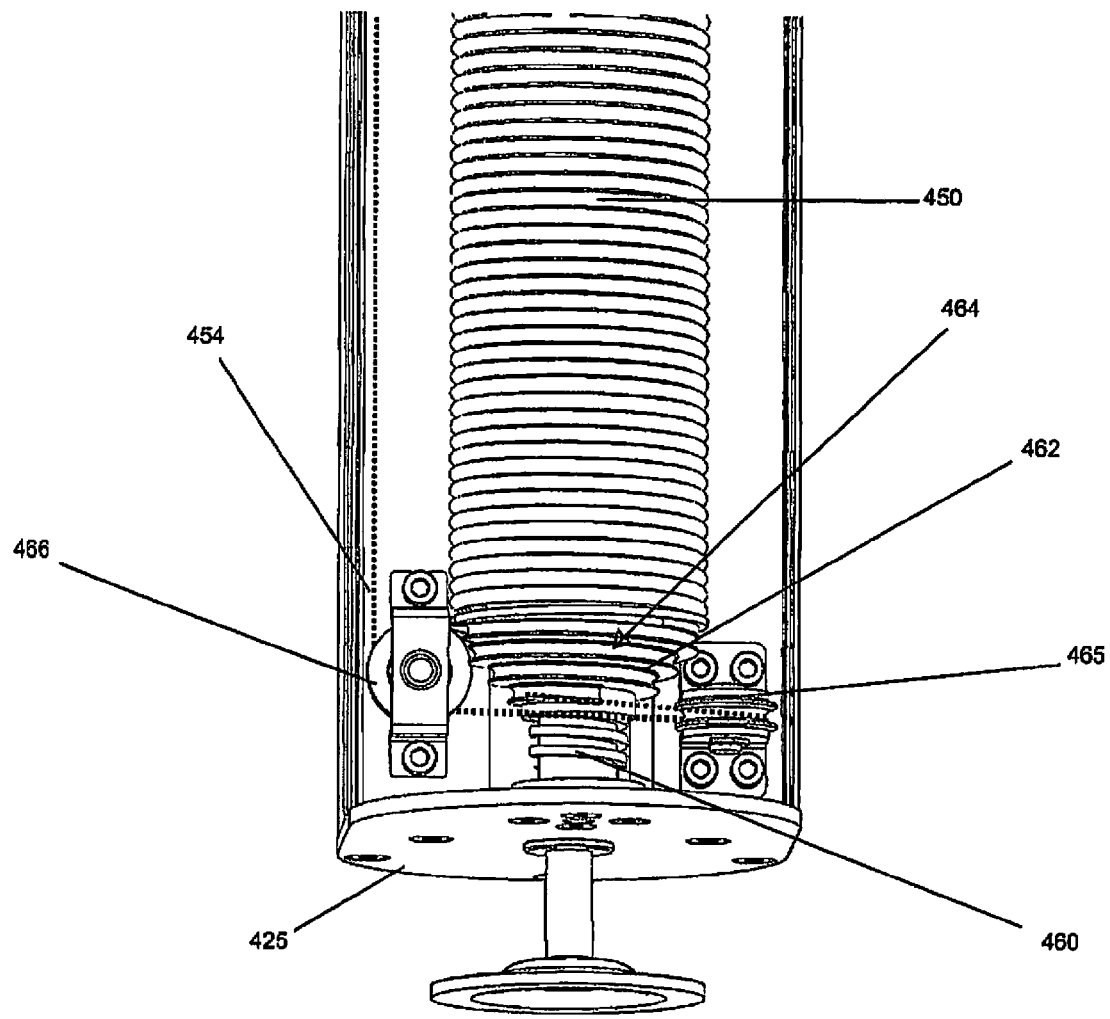
FIG. 36 is a rear perspective view of the lower portion of the counterbalance assembly of the height adjustable monitor and keyboard support of FIG. 35.
Figure 37:
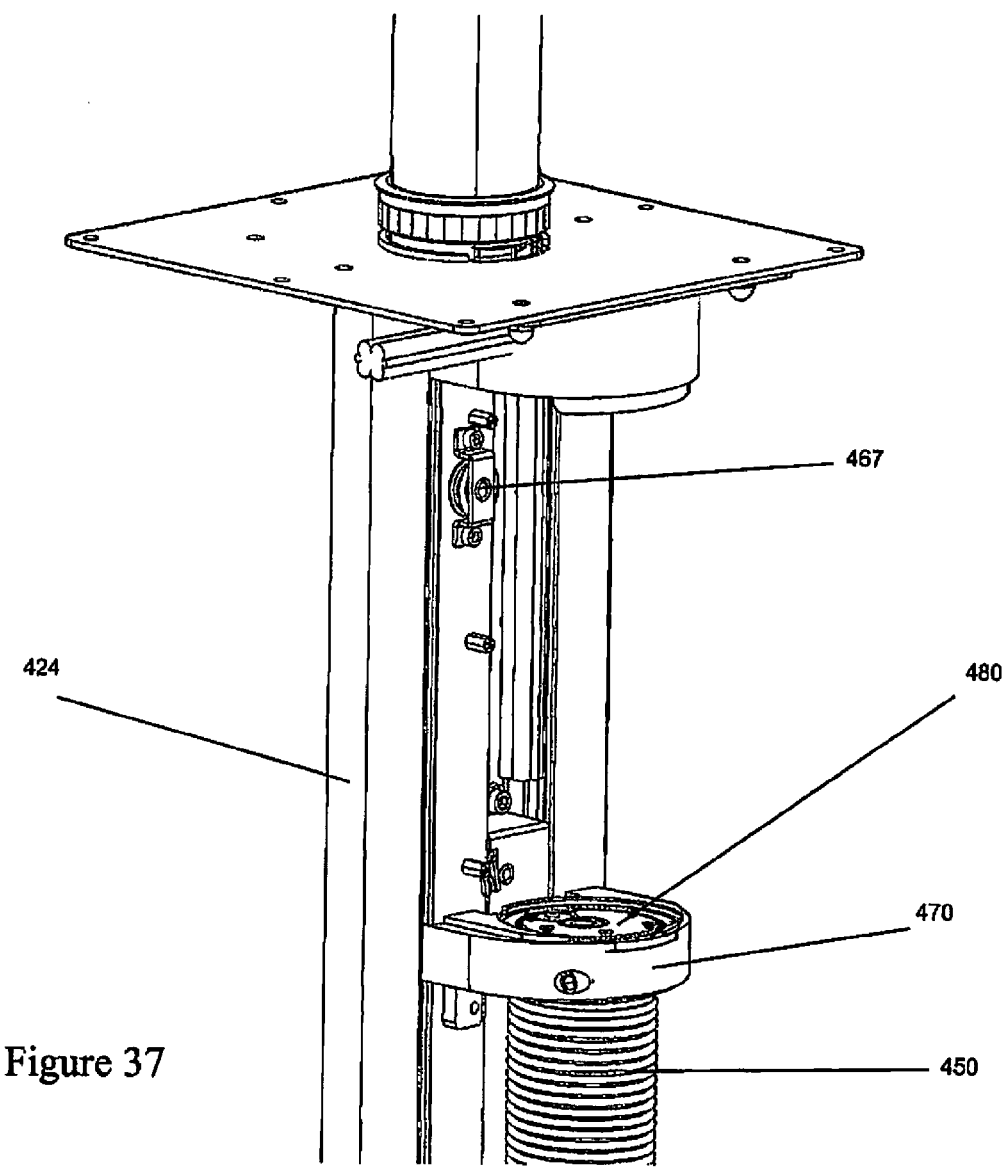
FIG. 37 is a rear perspective view of the upper portion of the counterbalance assembly of the height adjustable monitor and keyboard support of FIG. 35.
Figure 38:
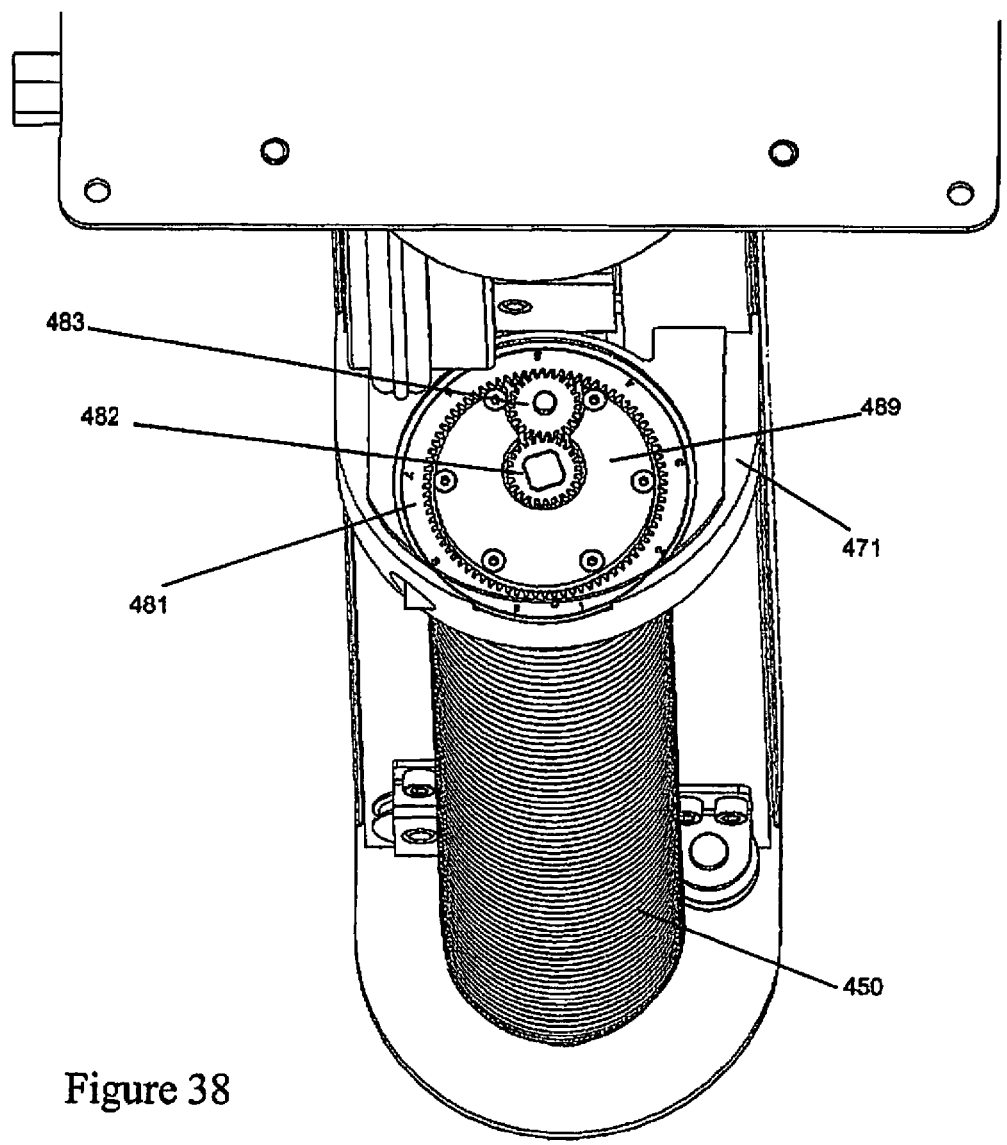
FIG. 38 is a top perspective view of the upper portion of the counterbalance assembly of the height adjustable monitor and keyboard support of FIG. 35.
Figure 39:
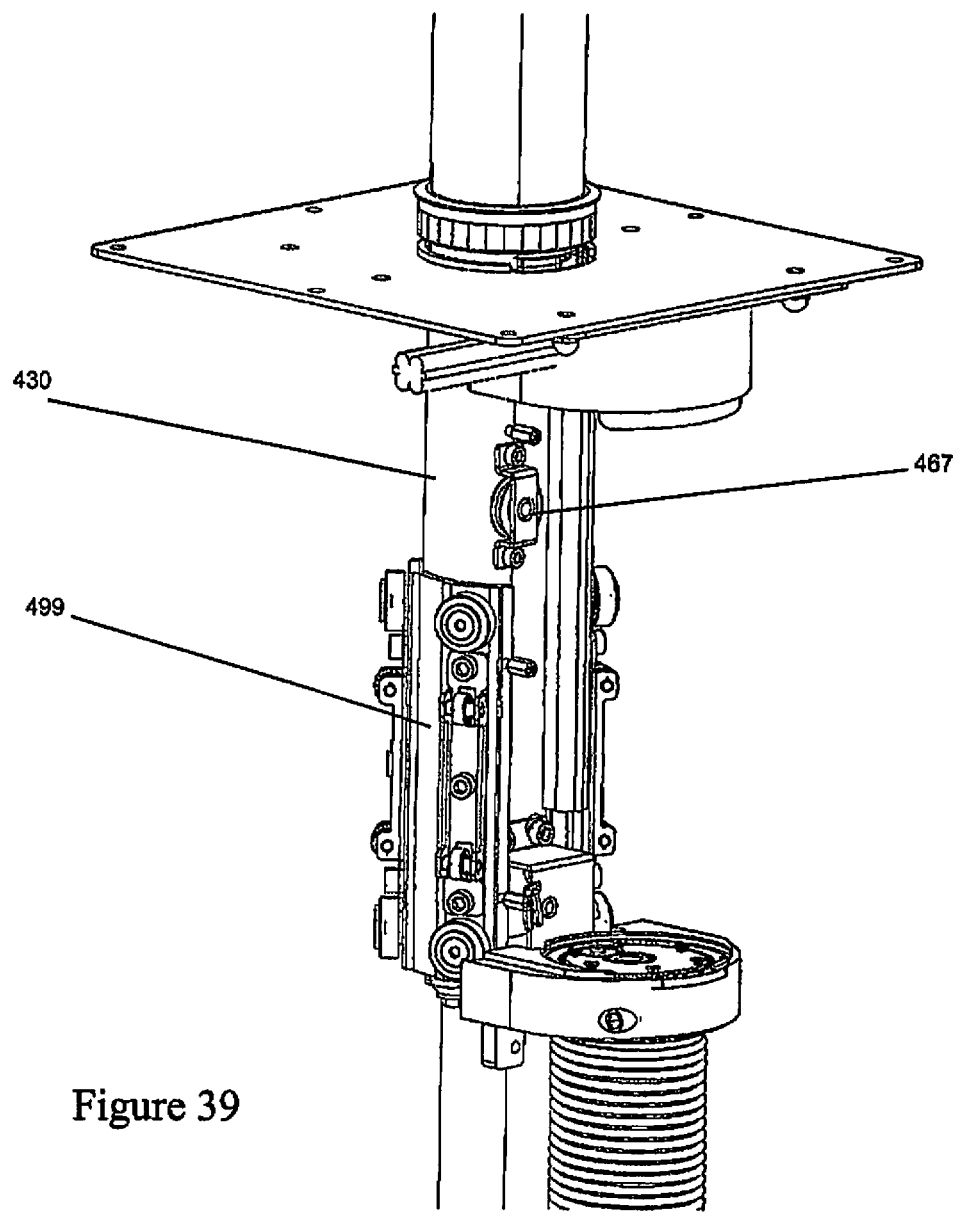
FIG. 39 is a side perspective view of the upper portion of the counterbalance assembly of the height adjustable monitor and keyboard support of FIG. 35 with the stationary column removed to reveal underlying components.
Figure 40:
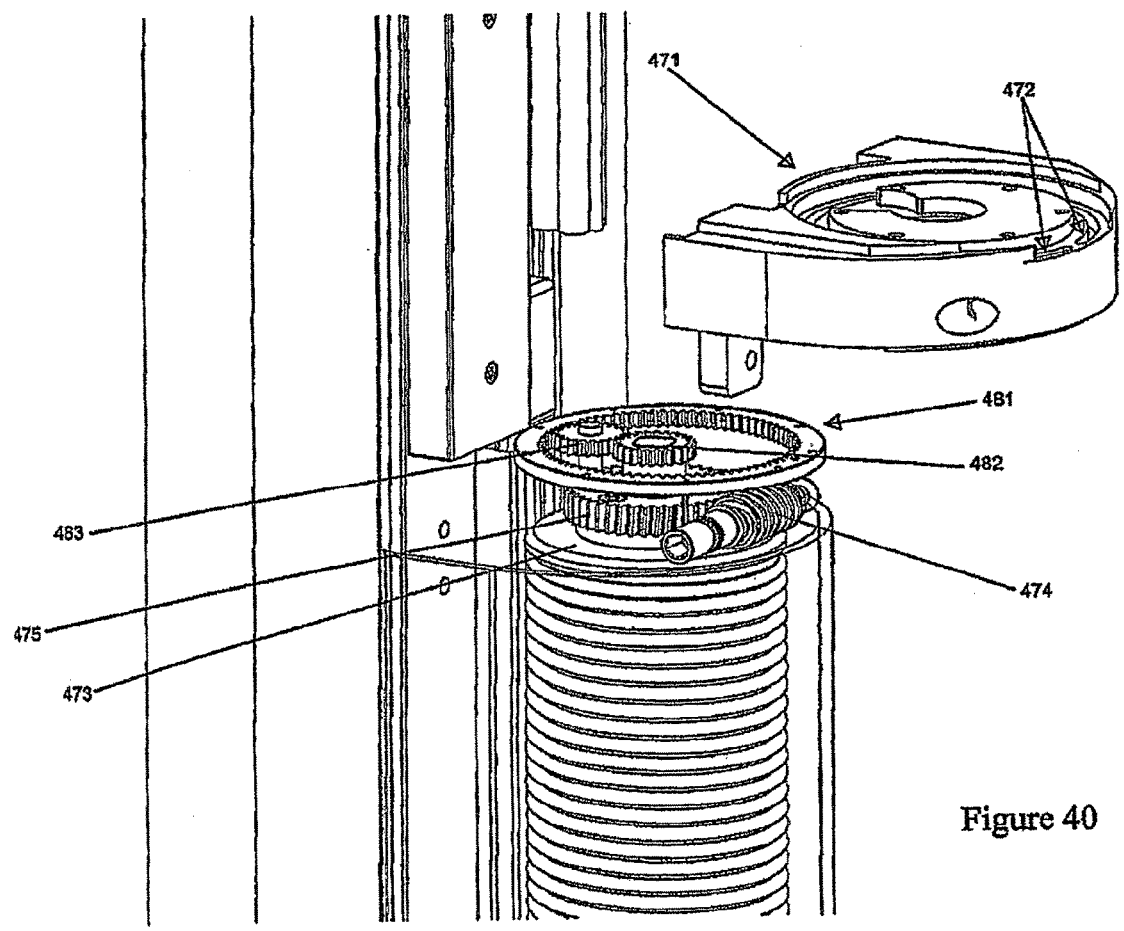
FIG. 40 is a side perspective view of the upper portion of the counterbalance assembly of the height adjustable monitor and keyboard support of FIG. 35 with the charging assembly housing removed to reveal underlying components.
Figure 41:
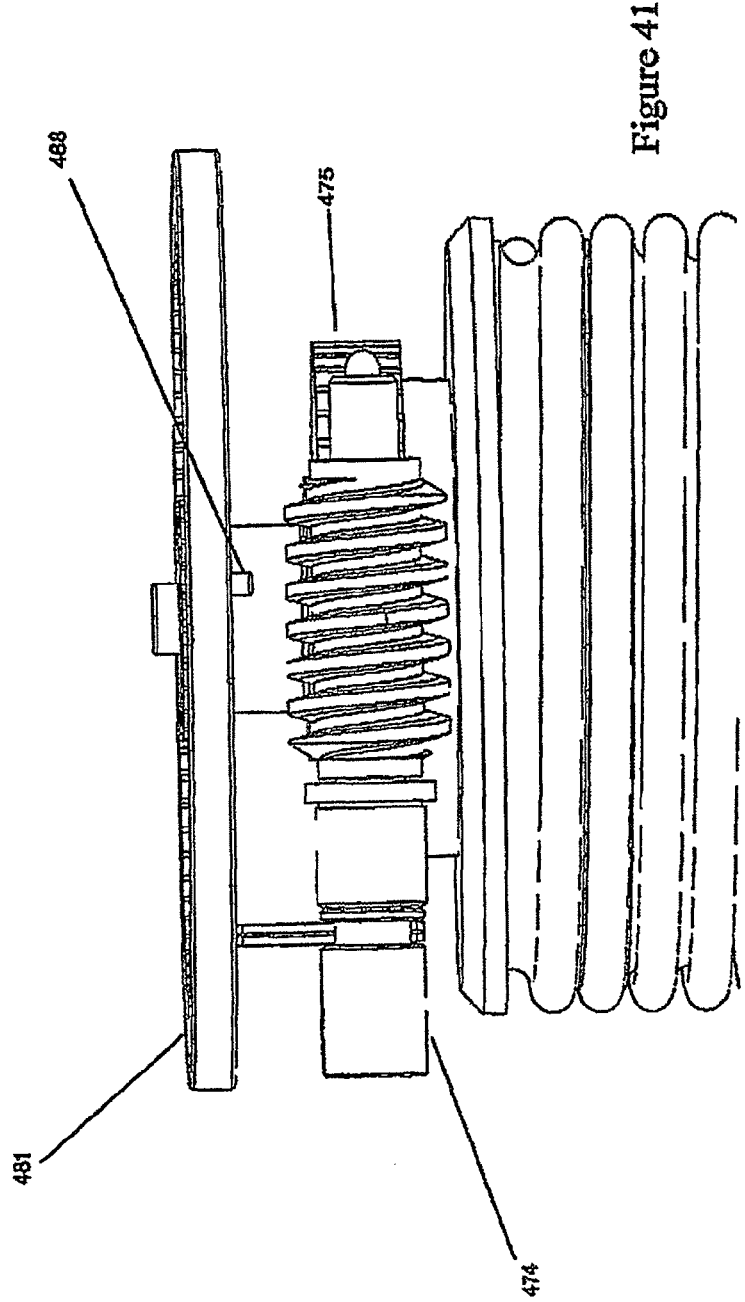
FIG. 41 is a rear view of the upper portion of the counterbalance assembly of the height adjustable monitor and keyboard support of FIG. 35 with the charging assembly housing removed to reveal underlying components.
Figure 42:
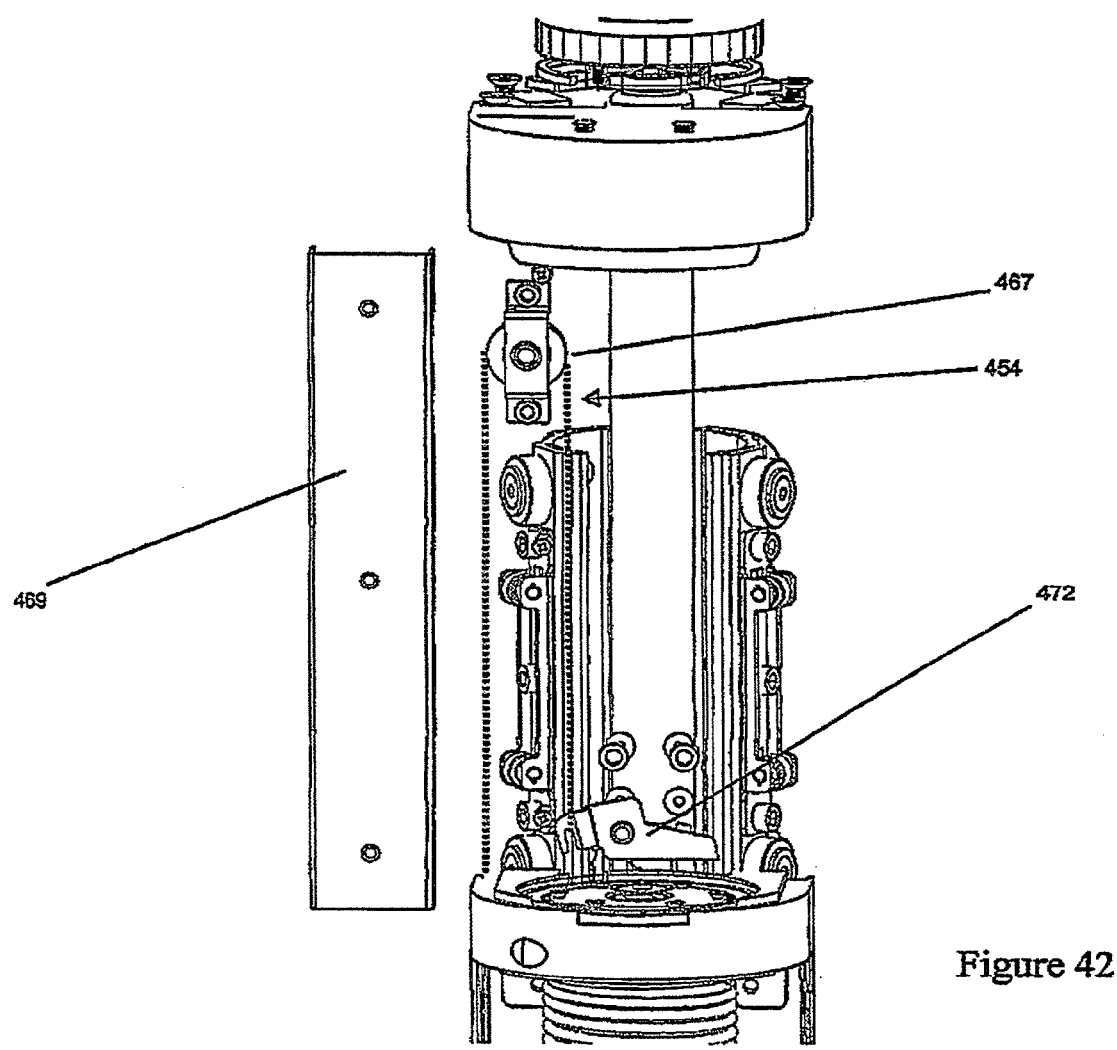
FIG. 42 is a rear view of the upper portion of the counterbalance assembly of the height adjustable monitor and keyboard support of FIG. 35 with the stationary column removed to reveal underlying components.

FIGS. 35 through 42 depict yet another embodiment of a height adjustable monitor and keyboard support 410 in accordance with the teachings of the present invention. As shown in FIG. 35, the movable column 430 can support a keyboard platform 442 and a monitor 412. A monitor mounting portion 440 can be used to mount the keyboard platform 442 and monitor 412 to the movable column 430. The height adjustable monitor and keyboard support 410 can be attached to a rigid work surface 18 (not shown), such as the desktop on a free-standing desk, via a support plate 443. In this embodiment, a stationary column 424 is positioned below the work surface 18 and is slidably coupled to the movable column 430. As shown in FIG. 39, any suitable linear slide mechanism known in the art, for example, through a roller cage assembly 499, can be utilized to enable sliding engagement between the movable column 430 and the stationary column 424.

The lift mechanism of the height adjustable monitor and keyboard support 410 includes a counterbalance assembly positioned adjacent to—or alternatively, housed within—the stationary column 424, with the counterbalance assembly functioning to operatively connect the stationary column 424 to the movable column 430. In the embodiment depicted in FIG. 35, the counterbalance assembly's torsion spring 450 is positioned adjacent to the stationary column 424. A torsion spring housing 451 (shown removed in FIG. 35) can be utilized to cover the torsion spring 450.

Referring now to FIGS. 36-37, 39, and 42, the counterbalance assembly can include a torsion spring 450 coupled to a spool 464 having a spiral profile 462, which operate in conjunction with the torsion spring 450 to provide a relatively constant counter-weighting force. The spool 464 is threaded internally and mounted to the drive shaft 460, with the lower end of the vertical drive shaft 460 being fixedly mounted to the horizontal mounting plate 425 of the stationary column 424. The vertical pitch of the spiral profile of the spool 464 can be equal to the vertical pitch of the profile of the drive shaft 460 and the internal thread of the spool 464, and the direction of the spiral profile of the spool 464 can run in the same direction as the profile of the drive shaft 460. In this arrangement, vertical movement of the movable column 430 will cause the spool 464 to move vertically along the length of the drive shaft 460, thereby providing constant horizontal alignment of a cable 454 with the horizontal pulley 465. The spool 462 can be operatively connected to the torsion spring 450 through a hub on the spool 462.

As depicted in FIGS. 36-37, 39, and 42, the counterbalance assembly can further comprise a cable 454, a plurality of pulleys 465-467, and a toggle 472 for operatively connecting the torsion spring 450 to the movable column 430. The cable 454 is preferably constructed out of nylon or another synthetic polymer, such as Dyneema® Ultra-High Molecular Weight Polyethylene fiber. However, in other embodiments, the cable can be constructed out of any other material known in the art, including but not limited to cotton, hemp, polymers, metals, or other synthetic fibers. A first end of the cable 454 is anchored to the spool 464. The spiral profile 462 has a variable radius relative to the vertical axis of rotation of the winding cone 464. As the spool 464 rotates, the length of the cable 454 engaging the spiral profile 462 varies in order to accommodate the vertical movement of the movable column 430. The spiral profile of the spool 464 converts the torque of the torsion spring 450 into a constant linear force. The cable 454 is routed from the spiral profile 462 around the horizontal pulley 465 to the lower vertical pulley 466, to the upper vertical pulley 467, and then it is fixedly attached to the toggle 472. This path of the cable 454 can be seen in FIGS. 36 and 42. Although not depicted in FIGS. 35-42, the toggle 472 can form part of the safety assembly described above with respect to the embodiment depicted in FIGS. 16 through 23 in order to prevent the movable column 430 from crashing down on a user or the work surface 18 should the cable 454 break.

Referring now to FIGS. 36-38 and 40-41, the counterbalance assembly can further comprise a preload mechanism and charging assembly 470 to adjust the tension on the torsion spring 450 depending on the amount of weight the height adjustable monitor and keyboard assembly 410 is intended to support. The preload mechanism and charging assembly 470 can comprise a charging assembly housing 471, a worm drive comprising a worm screw 474 meshed with a worm gear 475, and a gear box 480 operatively coupled to both the worm drive and the charging assembly housing 471. The gear box 480 can comprise an inner spur gear 482 operatively connected to the worm gear 475. The inner spur gear 482 is meshed with an outer spur gear 483, which in turn is meshed with a spur wheel 481. In this arrangement, rotation of the worm screw 474 (e.g., by using a hex key or other hand tool on the preload mechanism) will cause the worm gear 475 to rotate, which in turn will cause the inner spur gear 482 to rotate. The rotation of inner spur gear 482 can rotate a spring hub 473 that is operatively connected to top portion of the torsion spring 450. The rotation of the spring hub 473 alters the torque realized by the torsion spring 450. Rotation of the inner spur gear 482 can drive the outer spur gear 483 to rotate through interaction of the inner spur gear 482 with the outer spur gear 483, which in turn will cause the spur wheel 481 to rotate. A person of ordinary skill in the art could use more or less spur gears in order to rotate the spur wheel 481. By rotating the worm gear 475 and spring hub 473, a user can adjust the tension—and thus the counterbalancing force—applied by the torsion spring 450 to the lifting and lowering of the movable column 430. In a preferred embodiment the spur wheel 481 can feature a stopping pin 488 (see FIG. 41) which engages the limiting channels 472 in the charging assembly housing 471 to restrict the rotation of the spur wheel 481 and thereby prevent the over-loading or under-loading of the torsion spring 450.

Figure 43:
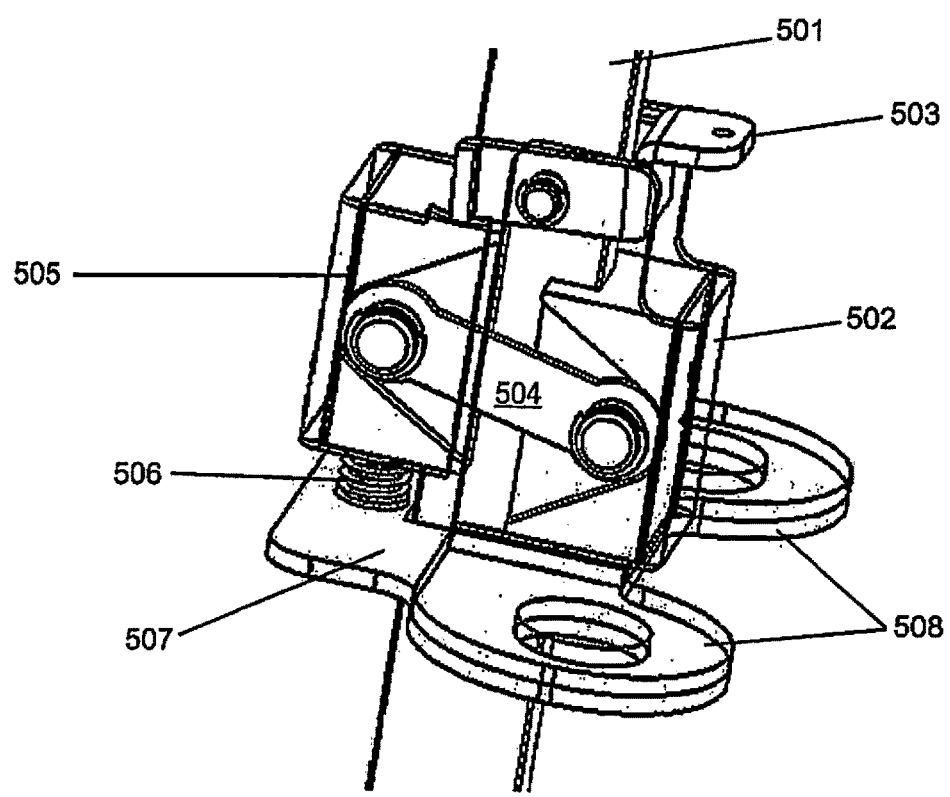
FIG. 43 is a side perspective view of the release assembly which functions to fixedly position the height adjustable keyboard support of FIG. 35.
Figure 44:
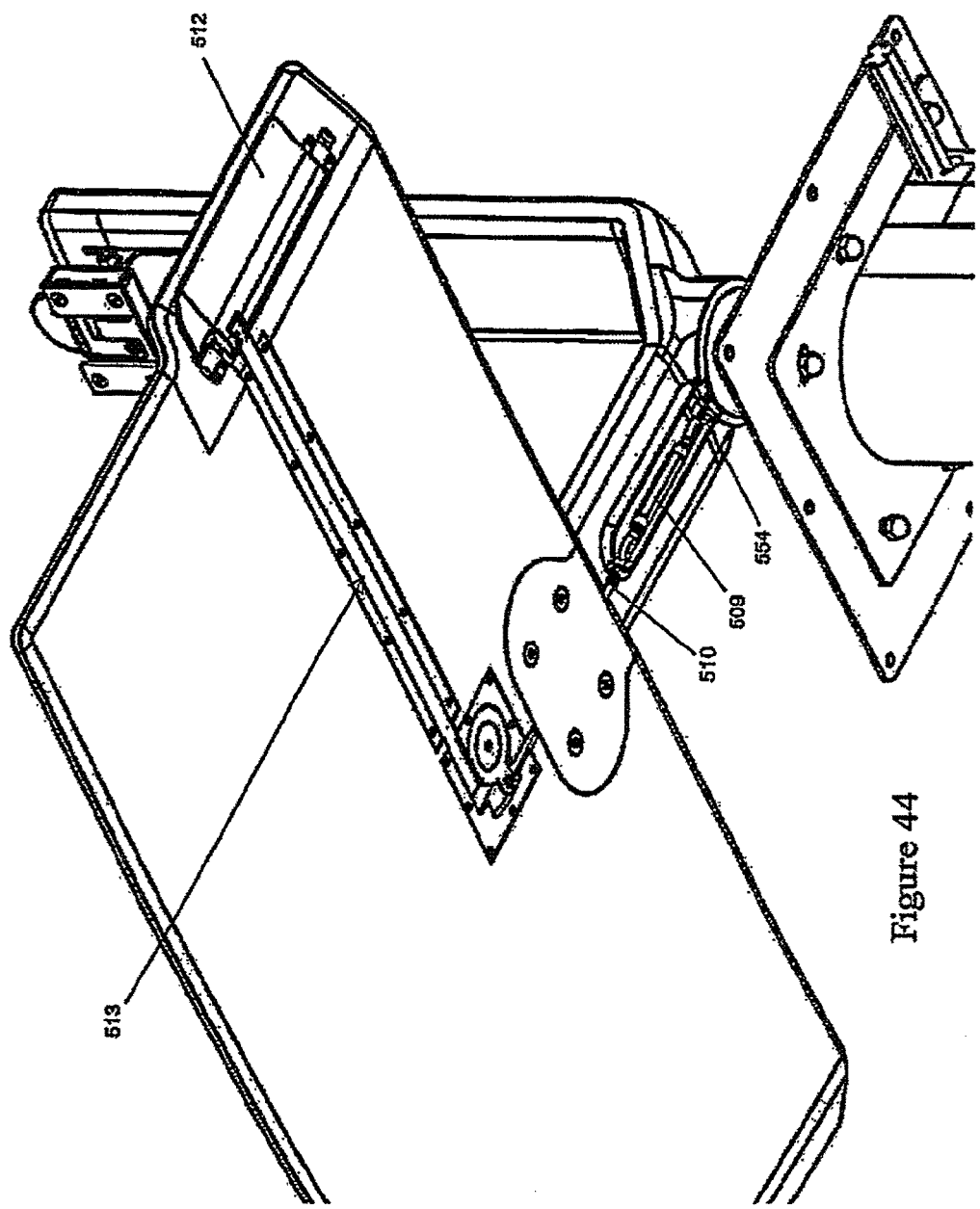
FIG. 44 is a bottom perspective view of the keyboard support of FIG. 35 showing the adjustable lock release handle and cable and their connection to the lowering support system through the underside of the keyboard and monitor mounting portions.

Referring now to FIGS. 43 and 44, the height adjustable monitor and keyboard support 410 can further comprise a release assembly for selectively locking the movable column 430—as well as the keyboard platform 442 and monitor 412 mounted thereto—at a desired height in the vertical plane. The release assembly can comprise a locking bar 501 which resides within the stationary column 424. The locking bar 501 is mounted to the horizontal mounting plate 425 and extends therefrom vertically within the stationary column 424. The release assembly can further comprise a brake coupler 502, a release actuator 503, a link 504, and a brake support 505, a spring 506 and a support plate 507. The release assembly is connected to the movable column mounts 508 by screws or other any other suitable method. The lower end of a cable (not shown) is attached to the release actuator 503 by passing through the opening in the release actuator and being secured to the release actuator. The cable extends vertically upward from the release actuator through the movable column 430 and attaches to turnbuckle 509, or any other suitable device for adjusting the tension of the cable. The turnbuckle 509 attaches to a link 510, which is connected to a pivot segment 511 on the underside of the keyboard tray 442. The pivot segment 511 is connected to the lock release handle 512 through a link 513. When the lock release handle 512 is engaged, the link 513 is translated such that the pivot segment 511 rotates and consequently pulls link 510 away from the movable column 430. Once the link 510 is pulled away from the movable column 430, the turnbuckle 509 is pulled towards the keyboard tray 442. Because the cable 554 connects the turnbuckle 509 to the release actuator 503 via a vertical pulley within the movable column (not shown), the release actuator 503 is pulled upwardly such that the brake support 505 is disengaged from the locking bar 501, thereby compressing the spring 506. This allows the movable column 430 to be raised and lowered in a vertical direction.

While various embodiments of lift mechanisms and monitor mounting configurations are disclosed herein, the scope of the invention is not limited to a particular lift mechanism configuration or to a particular monitor mounting configuration. The height adjustable monitor and keyboard support of the present invention can include any of the lift mechanisms disclosed herein or commonly known in the art, including a gas cylinder lift mechanism, in combination with any of the monitor mounting configurations described herein or commonly known in the art. Thus, the monitor mounting configurations and the lift mechanisms described herein can be interchangeable without departing from the scope of the present invention.

What is claimed is:

1. A height adjustable workstation for positioning a monitor and a keyboard relative to a work surface, the height adjustable workstation comprising:
   a) a stationary column positioned below the work surface;
   b) a movable column coupled to the stationary column and vertically extendable through an opening in the work surface;
   c) a keyboard platform supported by the movable column;
   d) a monitor mount supported by the movable column; and
   e) a counterbalance assembly positioned below the work surface and operatively coupled to both the stationary column and movable column to allow for counterbalanced height adjustment of at least one of the keyboard platform and monitor mount relative to the work surface, wherein the counterbalance assembly comprises:
      i) a spring providing a counter-balance force, the spring being selected from the group consisting of an extension spring and a torsion spring;
      ii) a drive shaft extending coaxially through the spring and mounted at its lower end to the stationary column;
      iii) a spool threaded internally and mounted to the drive shaft, the spool having an external spiral profile; and
      iv) a cable for operatively coupling the counterbalance assembly to the movable column, the cable having a first end fixedly attached to the external spiral profile of the spool and a second end fixedly attached to the movable column.

2. The height adjustable workstation of claim 1, wherein the heights of the monitor mount and keyboard platform are independently adjustable relative to the work surface.

3. The height adjustable workstation of claim 1, wherein the spring is positioned adjacent to the stationary column.

4. The height adjustable workstation of claim 1, wherein the spring is positioned within the stationary column.

5. The height adjustable workstation of claim 1, wherein the counterbalance assembly further comprises a preload mechanism and charging assembly for adjusting the counterbalance force of the torsion spring.

6. The height adjustable workstation of claim 5, wherein the preload mechanism and charging assembly comprises: i) a charging assembly housing; ii) a worm drive comprising a worm screw meshed with a worm gear; iii) a gear box operatively coupled to both the worm drive and the charging assembly housing; and iv) a spring hub operatively connecting the worm gear to the top portion of the torsion spring such that rotation of the worm gear adjusts the counterbalance force of the torsion spring.

7. The height adjustable workstation of claim 6, wherein the gear box comprises an inner spur gear operatively connected to the worm gear and meshed with an outer spur gear, with the outer spur gear being meshed with a spur wheel.

8. The height adjustable workstation of claim 7, wherein the spur wheel comprises a stopping pin engaged with a limiting channel formed in the charging assembly housing to restrict the rotation of the spur wheel and thereby prevent the over-loading or under-loading of the torsion spring.

9. The height adjustable workstation of claim 8, further comprising a release assembly for selectively locking the movable column at a desired height in a vertical plane, the release assembly comprising: i) a locking bar positioned within a stationary column; ii) a brake support releasably engaged with the locking bar, iii) a release actuator; and iv) a link attaching the release actuator to the brake support.

10. A height adjustable support for positioning a monitor and a keyboard relative to a work surface having an opening formed therethrough, the height adjustable support comprising:
   a) a first support member having an upper mounting portion and a lower free portion, whereby the first support member is attached to an underside of the work surface at the upper mounting portion and extends downward therefrom to the lower free portion; and
   b) a second support member having an upper portion and a lower portion, whereby the second support member is movably coupled to the first support member and extends upward therefrom, through the work surface opening; wherein the upper portion of the second support member comprises: i) a monitor arm for supporting the monitor, the monitor arm enabling the position of the monitor to be adjusted independently of the position of the keyboard relative to the work surface; and ii) a keyboard support for supporting the keyboard, the keyboard support enabling the position of the keyboard to be adjusted independently of the position of the monitor relative to the work surface;
   c) wherein the upper portion of the second support member is configured to support the monitor and the keyboard, and
   d) wherein vertical movement of the second support member relative to the first support member is operable to adjust the height of the monitor and the keyboard supported by the upper portion of the second support member relative to the work surface.

11. The height adjustable support of claim 10, wherein the first support member and the second support member are arranged in a telescoping relationship to accommodate height adjustment of the monitor and the keyboard supported by the upper portion of the second support member.

12. The height adjustable support of claim 10, wherein the first support member defines a recessed portion having a longitudinal track, and wherein the second support member is slidably engaged within the longitudinal track of the first support member.

13. The height adjustable support of claim 10, further comprising a lift mechanism having a counterbalance assembly configured to offset a variable load carried by the height adjustable support.

* * * * *